US009189680B2

(12) United States Patent
Komatsu et al.

(10) Patent No.: US 9,189,680 B2
(45) Date of Patent: Nov. 17, 2015

(54) AUTHENTICATION SYSTEM

(75) Inventors: Yuto Komatsu, Tokyo (JP); Tomoaki Yoshinaga, Sagamihara (JP); Satoshi Someya, Hadano (JP); Hiroto Nagayoshi, Kunitachi (JP); Daisuke Matsubara, Koganei (JP)

(73) Assignee: Hitachi Information & Telecommunication Engineering, Ltd., Yokohama-shi (JP)

( * ) Notice: Subject to any disclaimer, the term of this patent is extended or adjusted under 35 U.S.C. 154(b) by 465 days.

(21) Appl. No.: 13/613,772

(22) Filed: Sep. 13, 2012

(65) Prior Publication Data
US 2013/0063581 A1 Mar. 14, 2013

(30) Foreign Application Priority Data

Sep. 14, 2011 (JP) .................................. 2011-200869
Jun. 18, 2012 (JP) .................................. 2012-136747

(51) Int. Cl.
*G06K 9/00* (2006.01)
(52) U.S. Cl.
CPC ........ *G06K 9/00288* (2013.01); *G06K 9/00926* (2013.01)
(58) Field of Classification Search
CPC ........................... G06F 21/32; G06K 9/00221
USPC .................................................. 382/118, 115
See application file for complete search history.

(56) References Cited

U.S. PATENT DOCUMENTS

| | | | |
|---|---|---|---|
| 6,554,705 B1 * | 4/2003 | Cumbers .......................... 463/29 |
| 7,929,733 B1 * | 4/2011 | Lehnert et al. .................. 382/116 |
| 2002/0191817 A1 | 12/2002 | Sato et al. | |
| 2003/0039380 A1 * | 2/2003 | Sukegawa et al. ............. 382/118 |
| 2004/0008873 A1 | 1/2004 | Sogo et al. | |
| 2006/0126906 A1 | 6/2006 | Sato et al. | |
| 2006/0136575 A1 * | 6/2006 | Payne et al. .................... 709/219 |
| 2007/0241861 A1 * | 10/2007 | Venkatanna et al. .......... 340/5.52 |
| 2007/0252001 A1 * | 11/2007 | Kail et al. ....................... 235/380 |
| 2008/0238670 A1 * | 10/2008 | Carney et al. .................. 340/546 |
| 2008/0252412 A1 * | 10/2008 | Larsson et al. .................. 340/5.2 |
| 2011/0026782 A1 | 2/2011 | Ego | |
| 2012/0147042 A1 * | 6/2012 | Shinomoto et al. ............ 345/633 |
| 2012/0191692 A1 * | 7/2012 | Wang .............................. 707/709 |
| 2012/0294496 A1 * | 11/2012 | Nakamoto ...................... 382/118 |

FOREIGN PATENT DOCUMENTS

CN 101826151 A 9/2010
JP 2002-279466 A 9/2002
(Continued)

*Primary Examiner* — Dave Czekaj
*Assistant Examiner* — Alison Slater
(74) *Attorney, Agent, or Firm* — Foley & Lardner LLP

(57) ABSTRACT

It is provided an authentication system, comprising: a reader for obtaining identification information assigned to an identification device held by a subject; an authentication device for authenticating the identification information obtained by the reader; a camera for photographing a facial image of the subject; and a management device which is coupled to a terminal for issuing an alarm and which includes an image database in which the facial image photographed by the camera is accumulated, in which the management device is configured to: search the image database by using information obtained by at least one of the reader and the camera on an occasion of the authentication; determine a reliability of the authentication based on a result of analyzing the retrieved facial image; and transmit data for issuing the alarm to the terminal in a case where it is determined that the reliability is low.

12 Claims, 14 Drawing Sheets

(56) References Cited

FOREIGN PATENT DOCUMENTS

| | | |
|---|---|---|
| JP | 2003-346149 A | 12/2003 |
| JP | 2004-258963 A | 9/2004 |
| JP | 2007-102517 A | 4/2007 |
| JP | 2008-071366 A | 3/2008 |
| JP | 2009-259269 A | 11/2009 |
| JP | 2010-238181 A | 10/2010 |
| JP | 2011-034133 A | 2/2011 |

* cited by examiner

AUTHENTICATION RESULT DATABASE

FACIAL IMAGE DATABASE

US 9,189,680 B2

AUTHENTICATION SYSTEM

CLAIM OF PRIORITY

The present application claims priority from Japanese patent applications JP 2011-200869 filed on Sep. 14, 2011 and JP 2012-136747 filed on Jun. 18, 2012, the contents of which are hereby incorporated by reference into this application.

BACKGROUND OF THE INVENTION

This invention relates to an authentication system, in particular, a system for detecting impersonation made by a person entering/exiting from a room.

In recent years, there has been a growing need for security management conducted when people enter/exit a security zone with a growing interest in security issues including an increasing crime rate. Therefore, there is a high demand for more reliable security products. A room entry/exit management system mainly uses a method of reading a non-contact-type card or a contact-type card held by a subject through a card reader. Further, there is also a room entry/exit management system for performing authentication based on a facial image of the subject.

On the other hand, there is proposed a facial image retrieval system in which an image is retrieved with high reliability by using photographing time of the image. For example, JP 2007-102517 A discloses a method of recognizing a face by storing a prediction coefficient corresponding to time passing after a face is registered until the face is photographed and performing an arithmetic operation on a feature amount for predicting the time passing after the face is registered until the face is photographed.

Further, JP 2010-238181 A discloses a technology whose object is to "improve authentication precision for a face" and which includes: "a facial database storing section 5 for storing a plurality of pieces of registrant image data, which are image data on a facial portion of a registrant, by an orientation and a size of the registrant's face within the registrant image data; a face detecting section 1 for detecting the facial portion of a person included in the image data from the obtained image data; a facial feature point extracting section 2 for extracting a feature point of the person's face from the obtained facial image data which is the image data on the detected facial portion of the person; a facial orientation/size estimating section 3 for estimating the orientation and the size of the person's face within the obtained facial image data; a facial authentication section 4 for authenticating whether or not the person's face is the registrant's face from the registrant image data and the obtained facial image data; and an authenticated image updating section 6 for storing the obtained facial image data in the facial database storage section 5 as the registrant image data when the person's face is authenticated as the registrant's face by the facial authentication section 4 (see Abstract of JP 2010-238181 A).

However, the above-mentioned method disclosed in JP 2007-102517 A raises a problem in that precision of verification cannot be enhanced because the verification is performed against previously registered image data instead of against recent facial image data and a problem in that processing time for verification increases as the facial image data increases.

Further, with the technology disclosed in the above-mentioned JP 2010-238181 A, facial images continue to be accumulated in principle excluding a case where there is no free space in a memory area. Therefore, a deviation occurs between a current facial image of a user and the facial images accumulated within a database, or the facial images accumulated within the database have a biased tendency, which may deteriorate the authentication precision. If the authentication precision deteriorates, a risk of impersonation becomes high, which is not desired from the viewpoint of security.

An object of this invention is to issue an alarm to an administrator at high speed and with satisfactory precision based on a result of searching a facial image database in a case where a user uses a card to enter/exit a room.

SUMMARY OF THE INVENTION

The representative one of inventions disclosed in this application is outlined as follows. There is provided an authentication system, comprising: a reader for obtaining identification information assigned to an identification device held by a subject; an authentication device for authenticating the identification information obtained by the reader; a camera for photographing a facial image of the subject; and a management device which is coupled to a terminal for issuing an alarm and which includes an image database in which the facial image photographed by the camera is accumulated. The management device is configured to: search the image database by using information obtained by at least one of the reader and the camera on an occasion of the authentication; determine a reliability of the authentication based on a result of analyzing the retrieved facial image; and transmit data for issuing the alarm to the terminal in a case where it is determined that the reliability is low.

According to the representative embodiment of this invention, impersonation of a subject can be determined with high speed and satisfactory precision. Objects, configurations, and effects other than those described above become apparent from the following descriptions of embodiments.

BRIEF DESCRIPTION OF THE DRAWINGS

The present invention can be appreciated by the description which follows in conjunction with the following figures, wherein.

DETAILED DESCRIPTION OF THE PREFERRED EMBODIMENTS

First Embodiment

Figure 1:
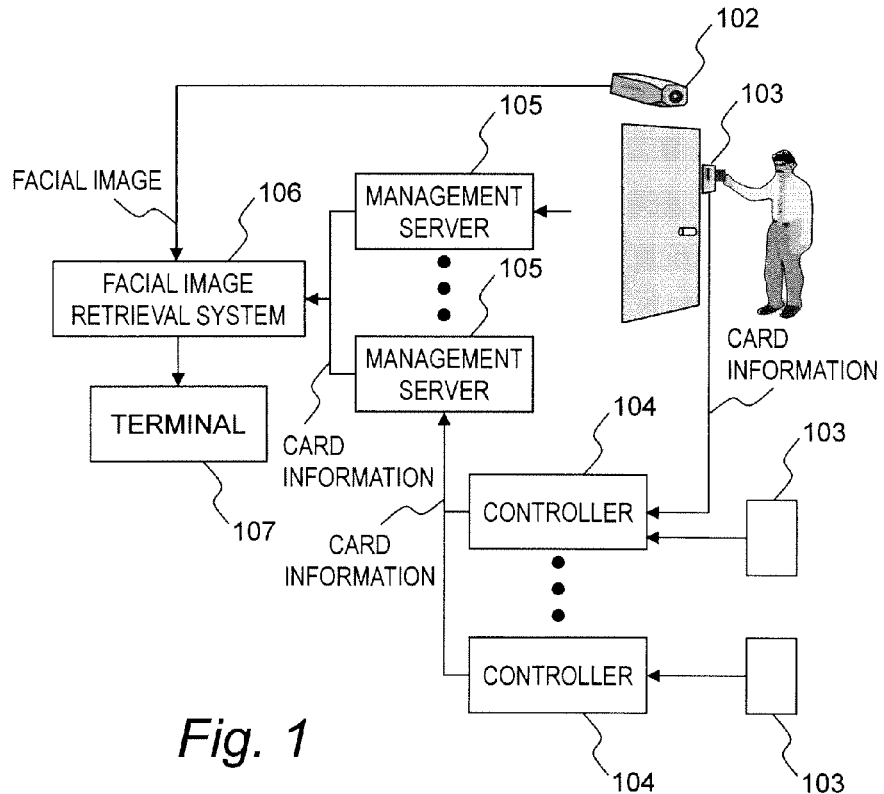
FIG. 1 is a block diagram illustrating a configuration of an authentication system according to a first embodiment of this invention.

FIG. 1 is a block diagram illustrating a configuration of an authentication system according to a first embodiment of this invention.

The authentication system according to the first embodiment includes a camera 102, a reader device 103, a controller 104, a management server 105, and a facial image retrieval system 106. In FIG. 1, a plurality of reader devices 103, a plurality of controllers 104, and a plurality of management servers 105 are provided, but the number thereof may be one each.

The camera 102 is an image pick-up device for photographing a subject to obtain a facial image thereof, and has a photographing range including a facial position of a person who operates the reader device 103. The reader device 103 is a device, for example, a card reader, for reading identification information (card ID) assigned to and stored in a storage medium (for example, magnetic card, IC card, or wireless tag) held by the subject.

The controller 104 controls the reader device 103 to perform processing based on authentication (for example, unlocking a door or unlocking a computer) when information obtained by the reader device 103 is successfully authenticated. FIG. 1 illustrates an example in which the plurality of reader devices 103 are coupled to one controller 104, but the controller 104 and the reader device 103 may be coupled to each other on a one-to-one basis.

The management server 105 is a computer including a processor for executing a program, a memory for storing the program executed by the processor, a communication interface for controlling communications to/from another device, and a nonvolatile storage device for storing an authentication result database 300. The authentication result database 300 is a database illustrated in FIG. 5, in which past authentication results of the subject are accumulated.

The management server 105 controls the controller 104 to authenticate the information obtained by the reader device 103, and sends a success/failure of the authentication to the controller 104. FIG. 1 illustrates an example in which the plurality of controllers 104 are coupled to one management server 105, but the management server 105 and the controller 104 may be coupled to each other on a one-to-one basis.

The facial image retrieval system 106 is a computer including a processor for executing a program, a memory for storing the program executed by the processor, a communication interface for controlling communications to/from another device, and a nonvolatile storage device for storing a facial image database 310. The facial image database 310 is a database illustrated in FIG. 6, in which the facial images of the subject are accumulated. Further, the facial image retrieval system 106 determines similarity/dissimilarity between the facial image photographed by the camera 102 and the accumulated facial images, and notifies a terminal 107 of presence/absence of impersonation of the subject. FIG. 1 illustrates an example in which the plurality of management servers 105 are coupled to one facial image retrieval system 106, but the number of management servers 105 may be one.

The terminal 107 is a computer including a processor for executing a program, a memory for storing the program executed by the processor, a communication interface for controlling communications to/from another device, and an input/output interface such as a keyboard or a display device.

FIG. 1 illustrates the respective devices and computers so as to be coupled to each other on a one-to-one basis, but those devices and computers may be coupled to each other through a network.

It should be noted that the program executed by the processor of each computer is provided to each computer through the nonvolatile storage medium or the network. Therefore, each computer may include an interface for reading a storage medium (such as CD-ROM or flash memory).

The reader device 103 obtains a card ID stored in a card held by the subject, and sends the obtained card ID to the controller 104. The controller 104 sends the card ID obtained by the reader device 103 to the management server 105, and the management server 105 sends the card ID obtained by the reader device 103 to the facial image retrieval system 106.

It should be noted that the reader device 103 and the camera 102 may be constructed as one device. In this case, the camera 102 and the facial image retrieval system 106 may be coupled to each other through the controller 104 and the management server 105 instead of being directly coupled to each other.

Further, the management server 105 authenticates the card ID by comparing the card ID obtained by the reader device 103 with information stored in an authentication database. When the authentication is successful, the management server 105 notifies the controller 104 of the successful authentication. When receiving a notification of the successful authentication, the controller 104 unlocks a door to which the reader device 103 is installed, and permits the subject to enter/exit the room. It should be noted that the user may be prompted to input a PIN number on an occasion of the authentication, and the authentication may be performed by using a combination of the PIN number input by the subject to the reader device 103 and the card ID.

The camera 102 is coupled to the facial image retrieval system 106, and sends the photographed facial image of the subject to the facial image retrieval system 106.

The facial image retrieval system 106 obtains the facial image photographed by the camera 102 and the card ID output from the management server 105, and associates the facial image with the card ID based on a time instant at which the facial image is photographed and a time instant at which the card ID is obtained. In addition, the facial image retrieval system 106 calculates a similarity between the photographed facial image and the accumulated facial image, and determines the similarity/dissimilarity of the two images. The similarity between the images can be calculated by using a known image matching technology. It should be noted that, in the embodiment of this invention, the similarity exhibiting a larger value as the images resemble each other to a larger degree is used.

The above-mentioned determination may be performed, as described later, by using narrowing down based on the card ID obtained by the reader device 103 or without using the narrowing down based on the card ID. In addition, the facial image retrieval system 106 determines the presence/absence of the impersonation of the subject based on a determination result thereof, and notifies the terminal 107 of the determination result for the impersonation.

The terminal 107, on which a display program (for example, web browser) is being executed, displays the determination result for the impersonation which is output from the facial image retrieval system 106 on a display screen. It should be noted that the facial image retrieval system 106 may output a result of similarity/dissimilarity determination of the facial image, and the terminal 107 may determine the presence/absence of the impersonation based on the similarity/dissimilarity determination result thereof.

Figure 2:
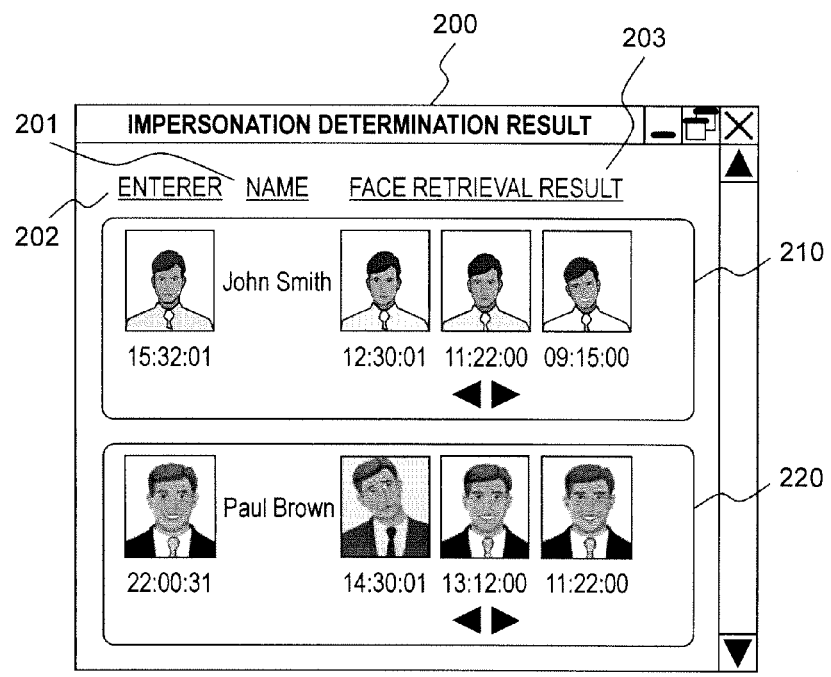
FIG. 2 is an explanatory diagram for illustrating example of a determination result displaying screen according to the first embodiment of this invention.
Figure 3:
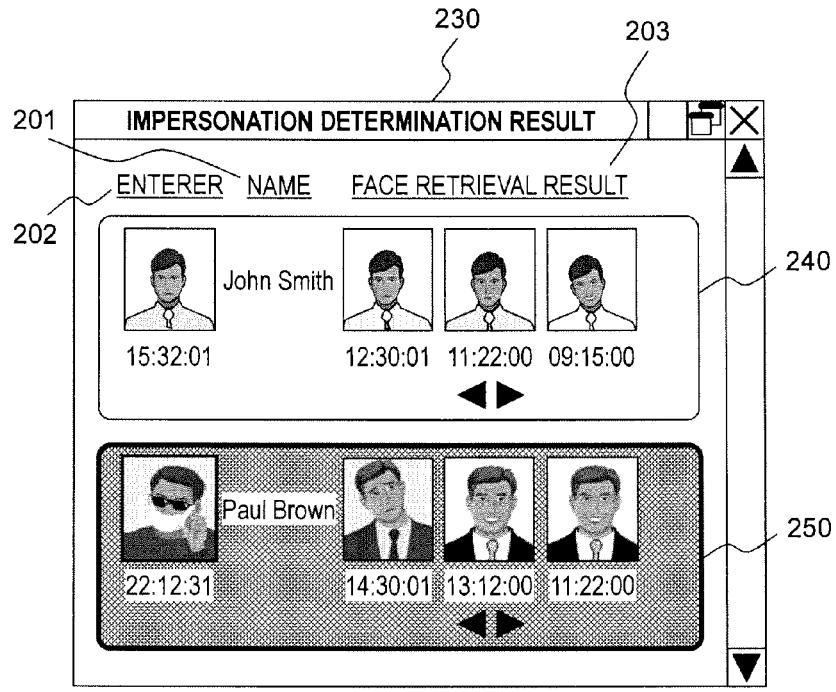
FIG. 3 is an explanatory diagram for illustrating example of a determination result displaying screen according to the first embodiment of this invention.

FIG. 2 and FIG. 3 are diagrams for illustrating examples of a determination result displaying screen displayed on the terminal 107 in order to notify of an impersonation determination result according to the first embodiment. FIG. 2 illustrates a determination result displaying screen 200 displayed in a case where the impersonation is not detected, and FIG. 3 illustrates a determination result displaying screen 230 displayed in a case where the impersonation is detected.

Each of the determination result displaying screens 200 and 230 includes, as illustrated in FIG. 2 and FIG. 3, an enterer field 202, a name field 201, and a face retrieval result field 203, and those pieces of information are displayed for each of subjects. Displayed in the enterer field 202 are the facial image corresponding to a time instant at which the reader device 103 obtains the card ID from the card of the subject and a time instant at which the facial image is photographed. Displayed in the name field 201 is a name corresponding to the card ID read from the card held by the subject. It should be noted that the name can be obtained by searching a subject database (not shown) stored in the facial image retrieval system 106 with the card ID used as a key. Displayed in the face retrieval result field 203 are the facial images registered in the facial image database 310 which correspond to the card ID obtained by the reader device 103 and time instants at which the facial images are photographed.

When the facial image retrieval system 106 does not detect the impersonation, as illustrated in FIG. 2, the facial image of the enterer, the name of the enterer, and the facial image retrieval results of the search are displayed on each of display areas 210 and 220 of the determination result displaying screen 200 which are provided for respective enterers.

On the other hand, when the facial image retrieval system 106 detects the impersonation, as illustrated in FIG. 3, a display area 250 for the enterer whose impersonation has been detected is displayed on the determination result displaying screen 230 in a different manner from a display area 240 for the enterer whose impersonation has not been detected. For example, as a display manner effected when the impersonation has been detected, as illustrated in FIG. 3, a background of the display area may be displayed with a color different from a normal state, the display area may be displayed with a frame different from a normal state, and an alarm may also be sounded.

Figure 4:
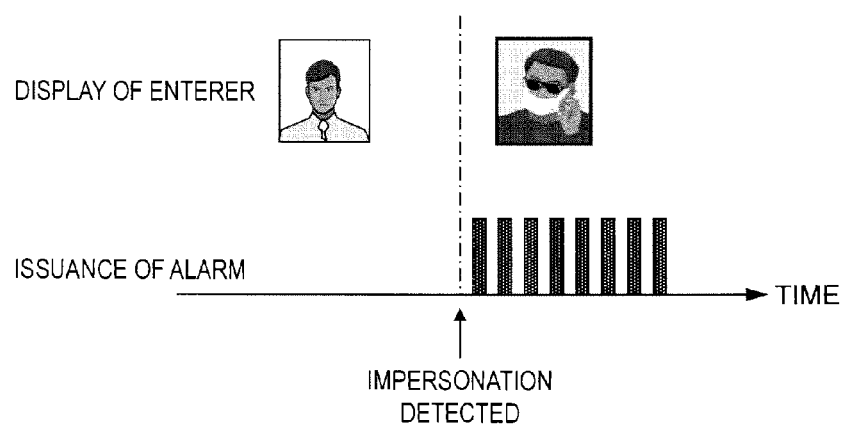
FIG. 4 is an explanatory diagram for illustrating example of issuing an alarm of impersonation detection according to the first embodiment of this invention.

The alarm indicating the fact that the impersonation has been detected is continued until an administrator confirms the fact, and may be continuously issued or, as illustrated in FIG. 4, intermittently issued. In the case of intermittently issuing the alarm, the above-mentioned background and frame are displayed so as to blink. Further, the alarm is intermittently sounded.

Figure 5:
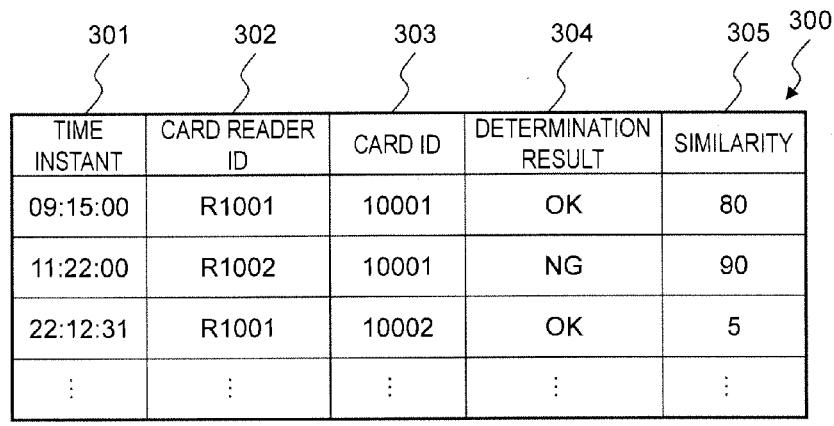
FIG. 5 is a diagram illustrating the authentication result database stored in the management server according to the first embodiment of this invention.

FIG. 5 is a diagram illustrating the authentication result database 300 stored in the management server 105 according to the first embodiment.

The authentication result database 300 stores information relating to authentication tried in the past, and includes a time instant 301, a card reader ID 302, a card ID 303, a determination result 304, and a similarity 305.

The time instant 301 is a time instant at which the card ID based on which the authentication is performed is obtained. It should be noted that time instant at which the management server 105 determines the authentication may be used. The card reader ID 302 is identification information for uniquely identifying the reader device 103 that has obtained the card ID based on which the authentication is performed. The card ID 303 is identification information on the storage medium in which the card ID based on which the authentication is performed is stored, and is used for uniquely identifying the subject holding the storage medium.

Stored in the determination result 304 is a flag indicating whether the authentication has been successful or has failed. The similarity 305 is a similarity between the facial image photographed on the occasion of the authentication and the facial images retrieved along with the authentication.

The management server 105 adds data to the authentication result database 300 each time the authentication of the subject is tried. In addition, the management server 105 sends the data added to the authentication result database 300 to the facial image retrieval system 106. The facial image retrieval system 106 adds the received data to the facial image database 310.

Figure 6:
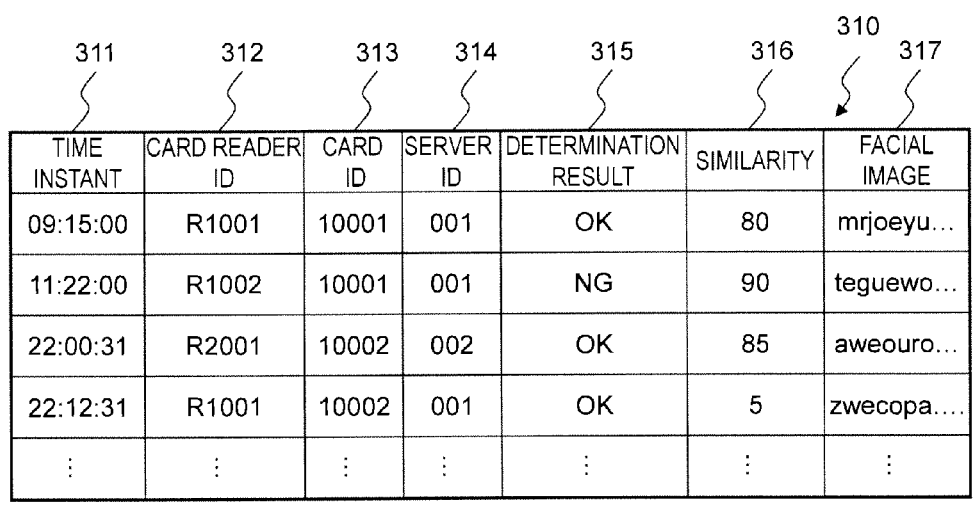
FIG. 6 is an explanatory diagram for illustrating the facial image database stored in the facial image retrieval system according to the first embodiment of this invention.

FIG. 6 is a diagram for illustrating the facial image database 310 stored in the facial image retrieval system 106 according to the first embodiment.

The facial image database 310 stores the facial image of the subject and information (for example, room entry/exit history) relating to the image, and includes a time instant 311, a card reader ID 312, a card ID 313, a server ID 314, a determination result 315, a similarity 316, and a facial image 317.

The same pieces of information as in the time instant 301, the card reader ID 302, the card ID 303, the determination result 304, and the similarity 305 included in the authentication result database 300 are stored in the time instant 311, the card reader ID 312, the card ID 313, the determination result 315, and the similarity 316, respectively. In other words, the facial image retrieval system 106 registers the above-mentioned data sent from each management server 105 in the facial image database 310 in association with the image photographed on the occasion of the authentication.

The server ID 314 is identification information for uniquely identifying the management server 105 that has transmitted the above-mentioned data to the facial image retrieval system 106 (in other words, processed the authentication). The facial image 317 is data on the facial image of the subject photographed on the occasion of the authentication. It should be noted that a link to an image file may be stored as the facial image 317 instead of binary data on the facial image.

It should be noted that, in addition to the facial image photographed by the camera 102, the previously registered facial image of the subject may be registered in the facial image database 310. Further, the data that has passed a predetermined period of time since the photographing (time instant at which the card ID is obtained) may be deleted from the facial image database 310.

Figure 7:
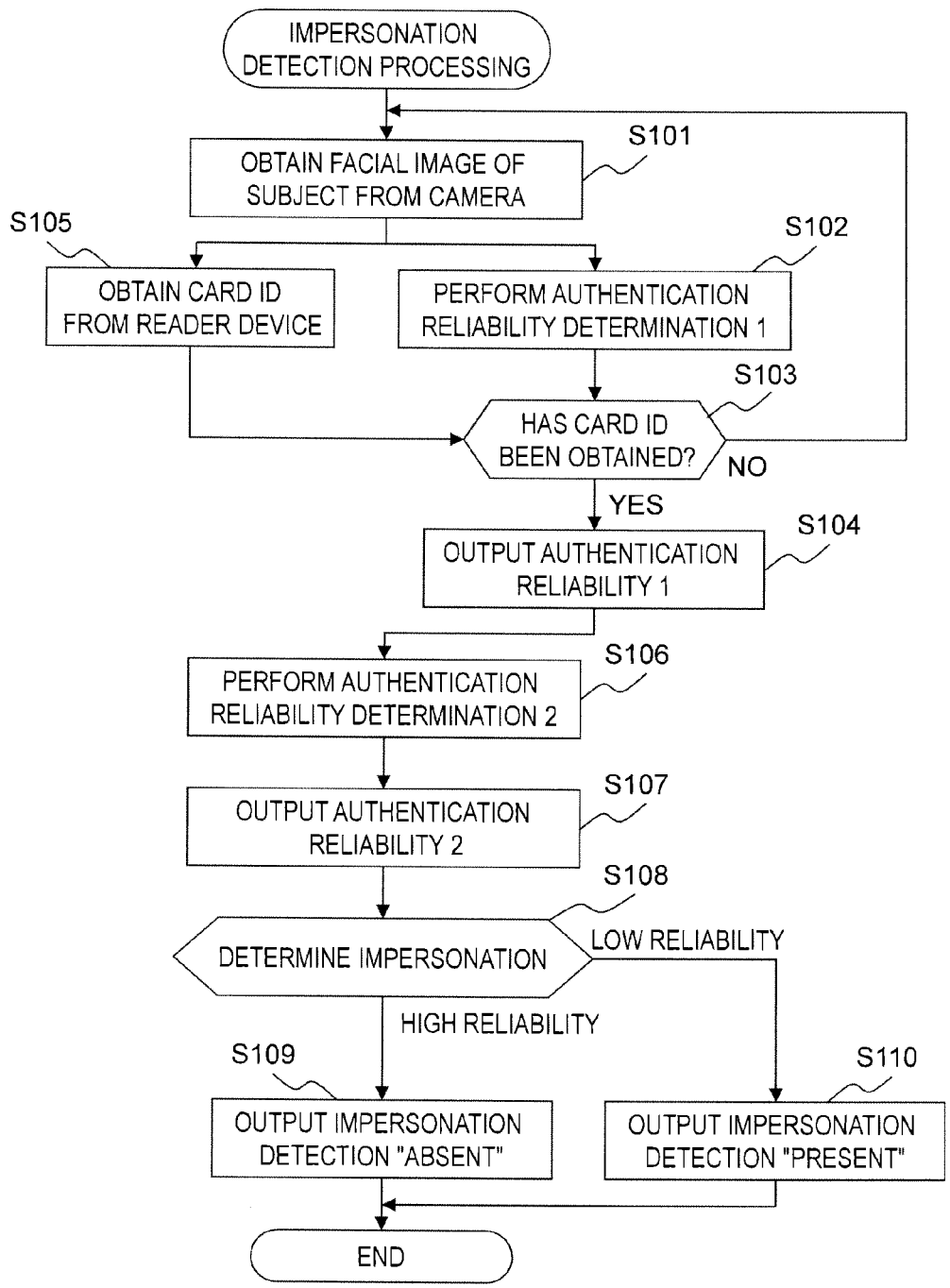
FIG. 7 is a flowchart illustrating an entirety of impersonation detection processing according to the first embodiment of this invention.

FIG. 7 is a flowchart illustrating an entirety of impersonation detection processing according to the first embodiment. The impersonation detection processing illustrated in FIG. 7 is executed by the processor of the facial image retrieval system 106 executing the program stored in the memory.

In the first embodiment, the camera 102 photographs the facial image of the subject at a timing at which the subject comes into the photographing range of the camera 102. In other words, the camera 102 constantly photographs a moving image, and when there is a change in a frame, captures the frame to obtain a still image. The camera 102 photographs a face of the subject that has come into the photographing range, and then sends the photographed facial image to the facial image retrieval system 106. The facial image retrieval system 106 starts the impersonation detection processing by receiving the facial image photographed by the camera 102 (S101).

Subsequently, the facial image retrieval system 106 determines a reliability of the authentication (S102). Specific details of a reliability determination processing 1 thereof are described later with reference to FIG. 9 to FIG. 11. When it is determined that the reliability of the authentication is low, the processing (S102) for determining the reliability of the authentication is repeatedly performed by using another facial image obtained by the camera 102 until the card ID is obtained from the reader device 103. On the other hand, when the reader device 103 is caused to read the card held by the subject, the reader device 103 reads the card ID stored in the card, and sends the read card ID to the facial image retrieval system 106 via the management server 105 (S105).

When the card ID read by the reader device 103 is obtained (S103), the facial image retrieval system 106 stops the reliability determination processing 1, and outputs the determination result for the reliability (S104).

Further, after stopping the reliability determination processing 1, the facial image retrieval system 106 uses the card ID read by the reader device 103 to further determine the reliability of the authentication (S106). Specific details of a reliability determination processing 2 are described later with reference to FIG. 12 to FIG. 14.

In the reliability determination processing 2, the card ID read by the reader device 103 and the facial image obtained by the camera 102 are used to determine the reliability of the authentication and output the reliability (S107).

Then, the determination results from the reliability determination processing 1 and the reliability determination processing 2 are used to determine the impersonation (S108). As a result of the determination, when it is determined that the reliability of the authentication is high, the possibility that the subject is impersonated by another person is low, and hence a display screen for impersonation detection "absent", which is illustrated in FIG. 2, is output to the terminal 107 (S109). On the other hand, when it is determined that the reliability of the authentication is low, the possibility that the subject is impersonated by another person is high, and hence a display screen for impersonation detection "present", which is illustrated in FIG. 3, is output to the terminal 107 (S110).

Figure 8:
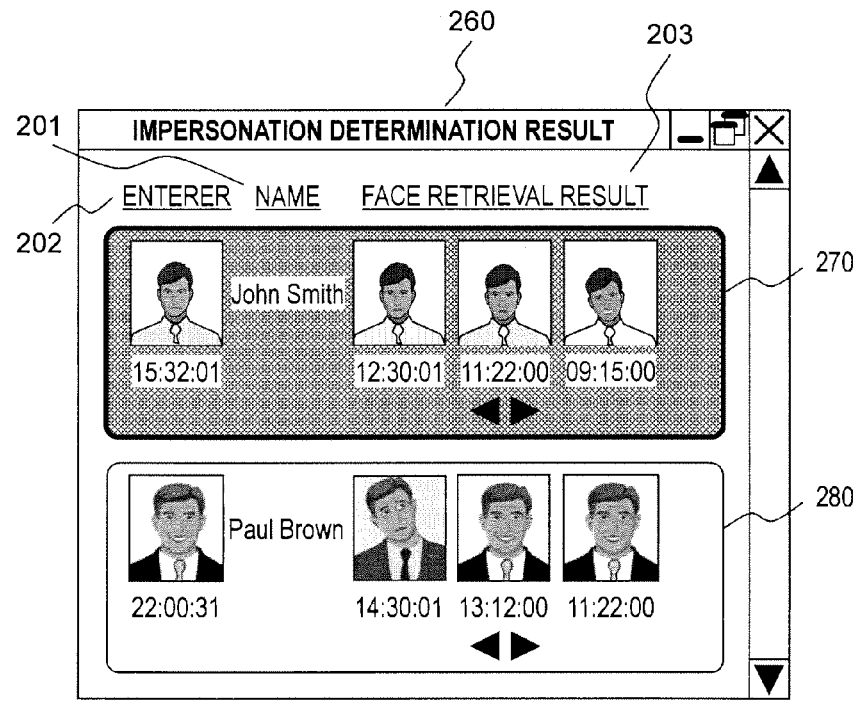
FIG. 8 is an explanatory diagram for illustrating another example of a screen for issuing an alarm according to the first embodiment of this invention.

FIG. 8 illustrates an example of issuing an alarm in Step S110. A determination result displaying screen 260 includes the enterer field 201, the name field 202, and the face retrieval result field 203, and displays those pieces of information for each subject. On the determination result displaying screen 260, a display area 270 for the enterer whose authentication is low in reliability is displayed in a different manner from a display area 280 for the enterer whose authentication is high in reliability. In the display manner effected in the case where the reliability of the authentication is low, the background of the display area is displayed in a color different from the normal state, and the display area is displayed with a frame different from the normal state. In addition, the alarm may be sounded, and the alarm may be issued continuously or intermittently.

After that, the processing is brought to an end with a termination command, or returns to Step S101 without the termination command to obtain the facial image of the subject from the camera 102.

Next, a description is made of three examples of details of the reliability determination processing 1 (S102).

Figure 9:
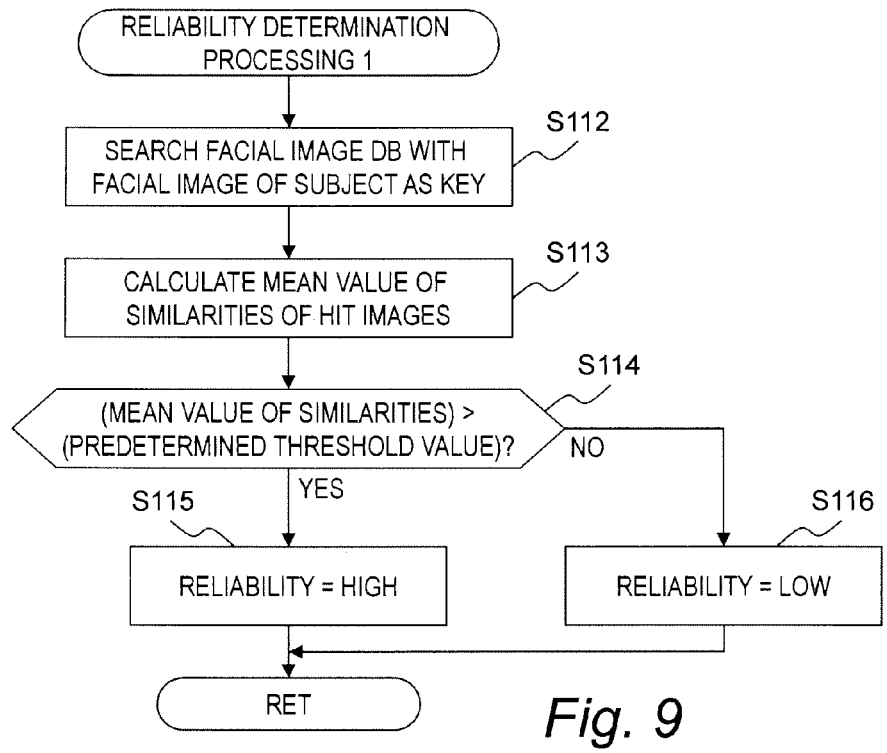
FIG. 9 is a flowchart of a first example of the reliability determination processing 1 according to the first embodiment of this invention.

FIG. 9 is a flowchart of a first example of the reliability determination processing 1 (S102). In the first example, reliability of the authentication is determined based on the similarity of the facial image.

First, the facial image retrieval system 106 searches the facial image database 310 by using as a key at least one facial image of the subject obtained in Step S101 to extract the facial images having a similarity equal to or larger than a predetermined similarity (S112).

Then, a mean value of the similarities between the facial images extracted from the facial image database 310 and the facial image obtained in Step S101 is calculated (S113).

Then, the reliability is determined by comparing the calculated mean value of the similarities with a predetermined threshold value (S114). Specifically, when the mean value of the similarities is higher than the predetermined threshold value, it is determined that the reliability of the authentication is high (S115). On the other hand, when the mean value of the similarities is lower than the predetermined threshold value, it is determined that the reliability of the authentication is low (S116). The number of threshold values used for the determination may be one or a plurality. In the case of using the plurality of threshold values, the reliability can be categorized into multiple stages of high/middle/low, and the alarm having a plurality of stages such as "normal", "caution", and "warning" can be issued in Steps S108 to S110.

It should be noted that the reliability may be determined based on a calculated total value of the similarities. The total value may be any one of the total value of the similarities of the hit images and the total value of the similarities of a predetermined number of hit images that are higher in similarity. Further, the reliability may be determined based on a calculated minimum value and a maximum value of the similarities. By using the total value of the similarities of all the hit images to determine the reliability, the reliability of the authentication can be determined in consideration of past authentication results.

Figure 10:
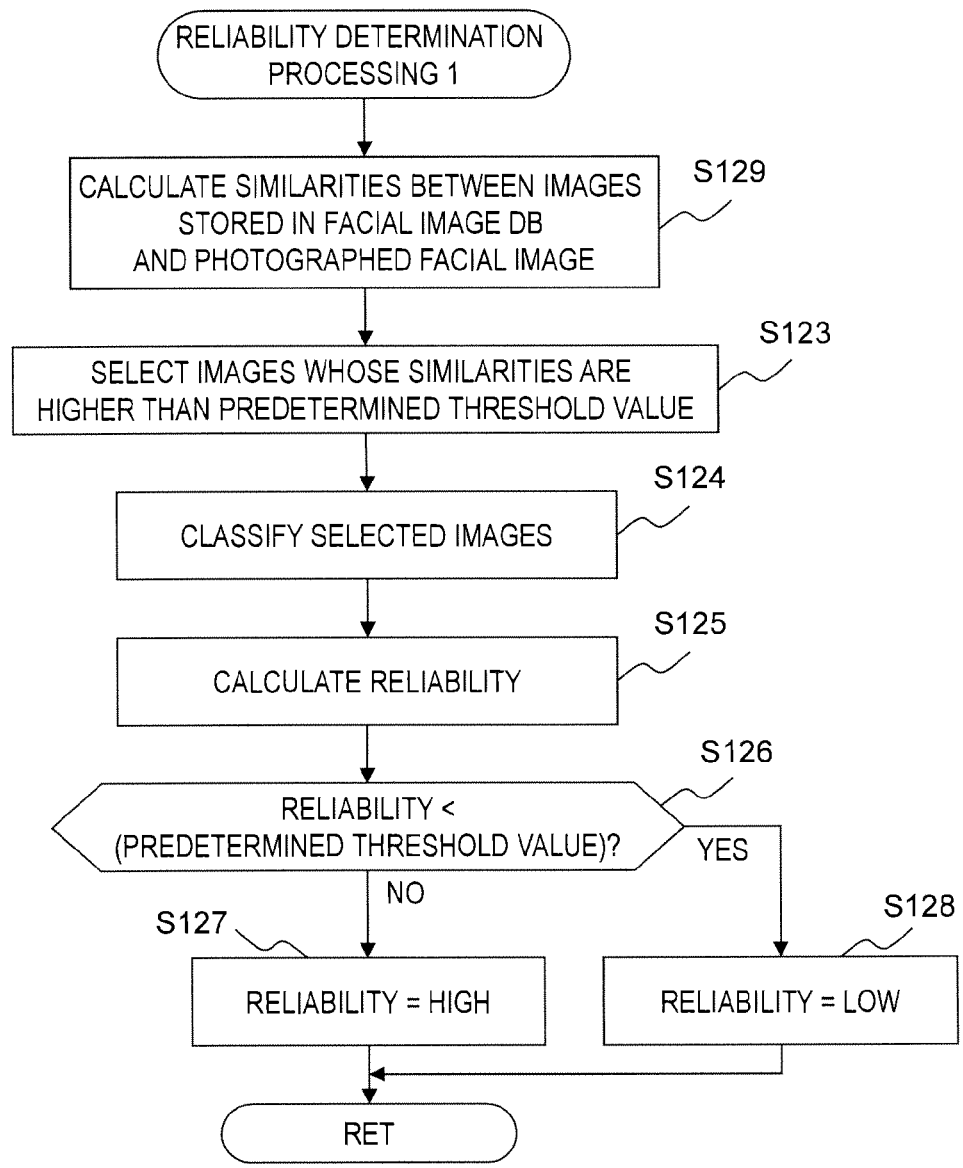
FIG. 10 is a flowchart of a second example of the reliability determination processing 1 according to the first embodiment of this invention.

FIG. 10 is a flowchart of a second example of the reliability determination processing 1 (S102). In the second example, reliability of the authentication is determined based on the past authentication results by the camera.

First, at least one facial image of the subject obtained in Step S101 is compared with the facial images stored in the facial image database 310 to calculate the similarities of the facial images stored in the facial image database 310 (S129).

Then, the calculated similarities are compared with the predetermined threshold value, to thereby select the facial images whose similarities are higher (S123).

After that, the selected facial images are classified in terms of the camera that has photographed the facial images (S124). It should be noted that, instead of classifying the facial images in terms of the camera, by selecting the images photographed by the same camera as the camera that has photographed the facial image obtained in Step S101, classification may be performed between the facial images photograph by the above-mentioned camera and the facial images photograph by another camera.

After that, the reliability of the classified images is calculated (S125), and the calculated reliability is compared with the predetermined threshold value to determine the reliability of the authentication (S126). In the determination of the reliability, for example, the reliability of the authentication is determined by calculating a sum of the similarities obtained when the classified images are successfully authenticated and comparing the calculated similarities with the predetermined threshold value.

Further, the number of classified images may be counted, the counted number of images may be compared with the predetermined threshold value, and when the number of images is large, it may be determined that the reliability of the authentication is high. The number of images obtained on an occasion of the successful authentication may be counted among the classified images, the counted number of images may be compared with the predetermined threshold value, and when the number of images is large, it may be determined that the reliability of the authentication is high.

Further, a total of values obtained by multiplying the similarity calculated when the classified images are photographed and the similarity calculated on the occasion of the current authentication may be obtained, the total value may be compared with the predetermined threshold value, and when the total value is large, it may be determined that the reliability of the authentication is high.

In addition, instead of comparing the similarity or the number of images with the predetermined threshold value, those values (similarity and number of images) may be compared in terms of the camera that has photographed the image, and when a proportion of the above-mentioned camera to the whole is large, it may be determined that the reliability of the authentication is high. Further, those values (similarity and number of images) may be compared in terms of the camera that has photographed the image, and when a ratio of the proportion of the above-mentioned camera ranked in the first place to a proportion of the camera ranked in the second place is large, it may be determined that the reliability of the authentication is high.

Then, when the reliability is larger than the predetermined threshold value, it is determined that the reliability is high (S127), and when the reliability is smaller than the predetermined threshold value, it is determined that the reliability is low (S128).

As described above, in the second example, by using the number of facial images obtained from the facial image database 310 to determine the reliability of the authentication, the alarm can be issued in consideration of the past authentication results. Further, the similarity of the facial image is not calculated, which allows the reliability of the authentication to be determined with a small amount of calculation.

Figure 11:
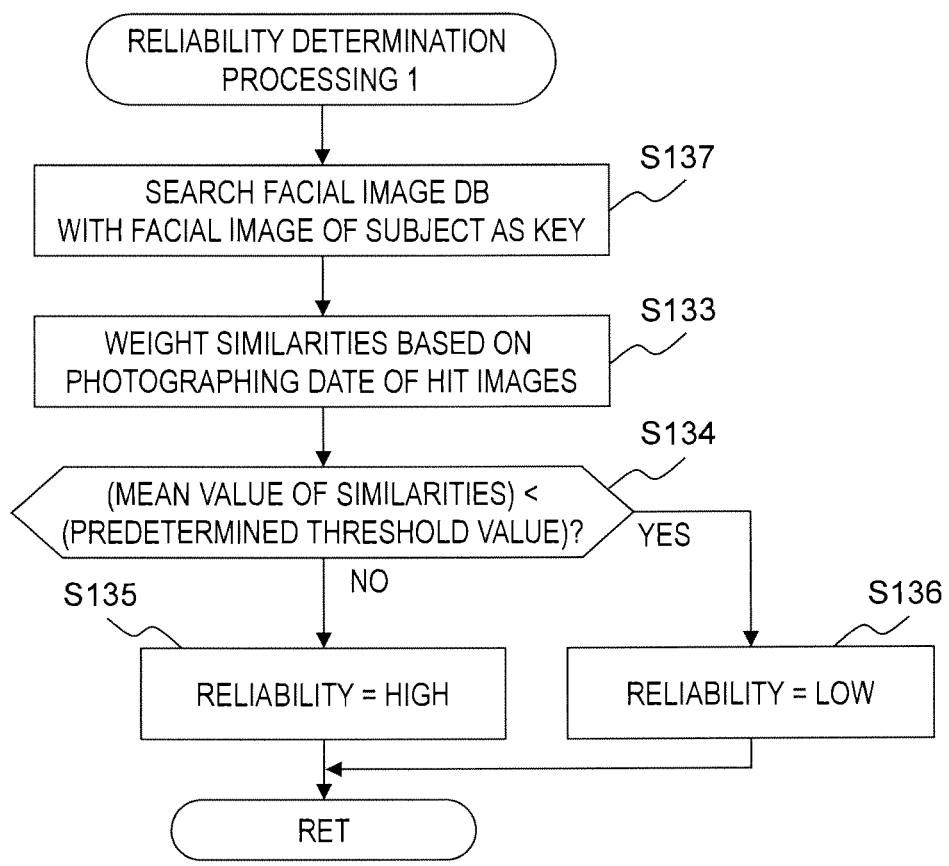
FIG. 11 is a flowchart of a third example of the reliability determination processing 1 according to the first embodiment of this invention.

FIG. 11 is a flowchart of a third example of the reliability determination processing 1 (S102).

First, the facial image retrieval system 106 searches the facial image database 310 by using as a key at least one facial image of the subject obtained in Step S101 to calculate the similarities between the facial image of the subject obtained in Step S101 and the facial images stored in the facial image database 310 to thereby extract the facial images having a similarity equal to or larger than a predetermined similarity (S137).

After that, the calculated similarities are weighted by a photographing date/time of the facial images extracted from the facial image database 310 (S133). Specifically, the photographing dates/times of the facial images obtained from the facial image database 310 are compared with a current date/time, values (elapsed times) obtained by subtracting the photographing dates/times from the current date/time are categorized based on a predetermined reference, weights on the respective facial images are determined, and the calculated similarities are multiplied by determined coefficients. For example, the coefficients can be determined as follows.

within 30 days from current date/time: 1.5
from 30 days to 60 days: 1.0
60 days and later: 0.5

Further, the weights (coefficients) may be determined according to a predetermined calculation expression without using a table described above. For example, the weights can be calculated by an expression using a logarithm value of the elapsed time so that the weight on a recent image is largely different from the weight on an old image.

After that, the mean value of the weighted similarities is compared with the predetermined threshold value (S134). As a result, when the mean value of the similarities is smaller than the predetermined threshold value, it is determined that the reliability of the authentication is high (S135). On the other hand, when the mean value of the similarities is larger than the predetermined threshold value, it is determined that the reliability of the authentication is low (S136).

In the third example, in the same manner as in the above-mentioned first example, instead of the mean value of the similarities, various statistics can be used to determine the reliability.

So far, processing that applies weighting to the above-mentioned first example is described, but the weighting of the third example can be applied to the above-mentioned second example. In this case, the total value of weighting coefficients is the number of images, and can be used to determine the reliability of the authentication.

As described above, in the third example, newer images make major contributions to the reliability, while older images make minor contributions to the reliability, which allows the reliability to be determined with improved precision.

As described above, according to the first embodiment, by detecting the impersonation based on the facial image of a user and card information thereon, it is possible to issue an alarm about the impersonation of the subject with satisfactory precision. Further, it is possible to determine the impersonation by using not only the previously registered facial images but also the facial images photographed on the occasion of the authentication.

Next, a description is made of four examples of details of the reliability determination processing 2 (S106).

In the first example, reliability of the authentication is determined based on the similarity of the facial image without using the obtained card ID.

The first example of the reliability determination processing 2 (S106) is the same as the above-mentioned first example of the reliability determination processing 1, and hence a detailed description thereof is omitted.

Figure 12:
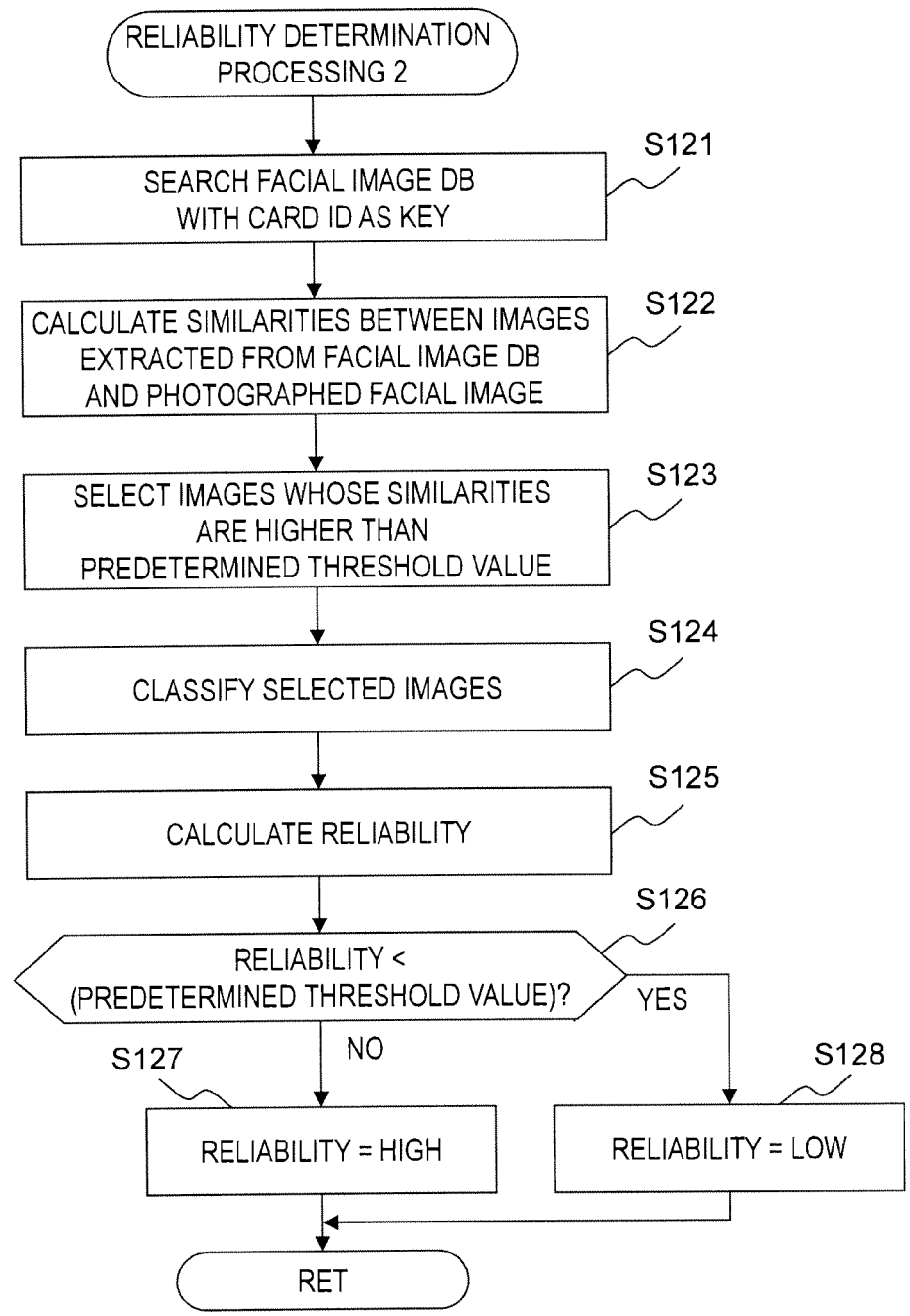
FIG. 12 is a flowchart of a second example of the reliability determination processing 2 according to the first embodiment of this invention.

FIG. 12 is a flowchart of a second example of the reliability determination processing 2 (S106). In the second example, reliability of the authentication is determined based on the past authentication results by the camera.

First, the facial image retrieval system 106 searches the facial image database 310 by using the card ID obtained in Step S105 as a key to obtain facial images associated with the card ID (S121).

Then, similarities between the facial images extracted from the facial image database 310 and the facial image obtained in Step S101 is calculated (S122).

After that, the processing of Steps S123 to S128 is executed. The processing of Steps S123 to S128 is the same as the processing of the above-mentioned second example of the reliability determination processing 1.

Figure 13:
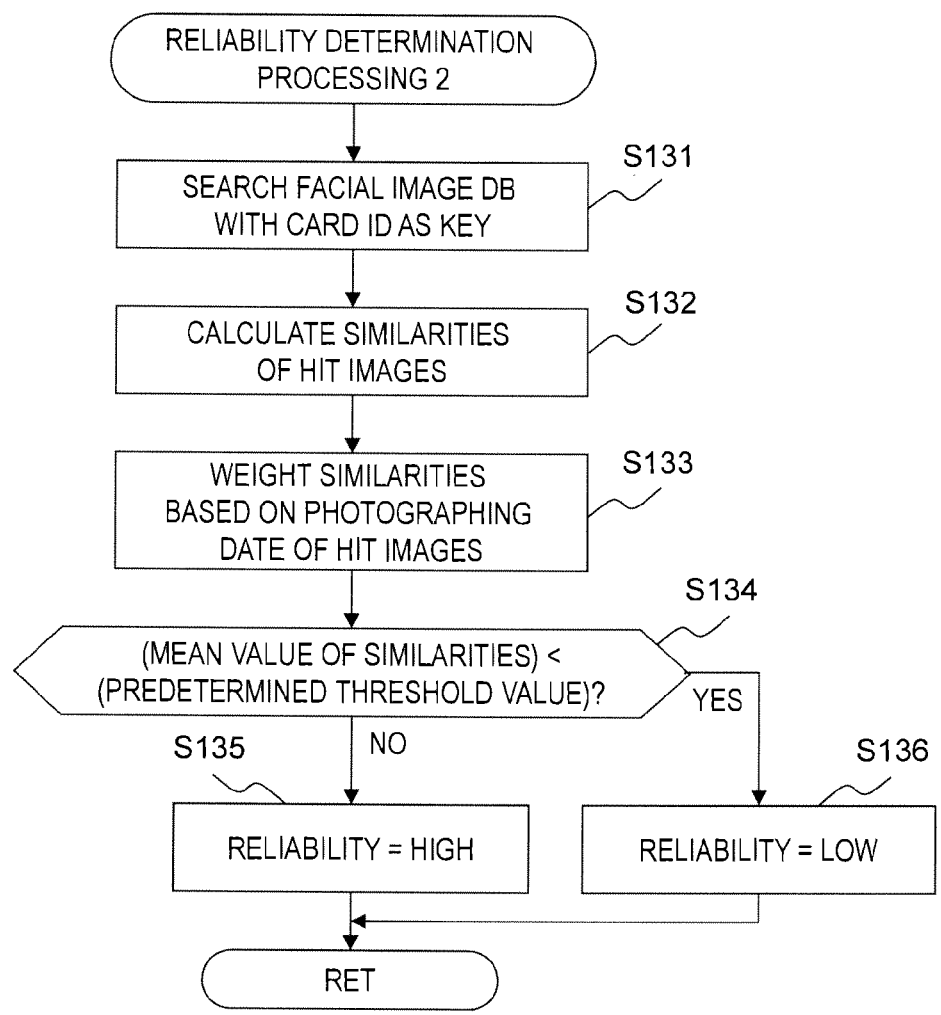
FIG. 13 is a flowchart of a third example of the reliability determination processing 2 according to the first embodiment of this invention.

FIG. 13 is a flowchart of a third example of the reliability determination processing 2 (S106). The third example is a modified example supplementary to the above-mentioned first and second examples, and each of the facial images obtained from the facial image database 310 is weighted based on the photographing date/time.

First, the facial image retrieval system 106 searches the facial image database 310 by using the card ID obtained in Step S103 as a key to obtain facial images associated with the card ID (S131).

Then, similarities between the facial images extracted from the facial image database 310 and the facial image obtained in Step S101 (in other words, photographed in the authentication) is calculated (S132).

After that, the processing of Steps S133 to S136 is executed. The processing of Steps S133 to S136 is the same as the processing of the above-mentioned third example of the reliability determination processing 1.

Figure 14:
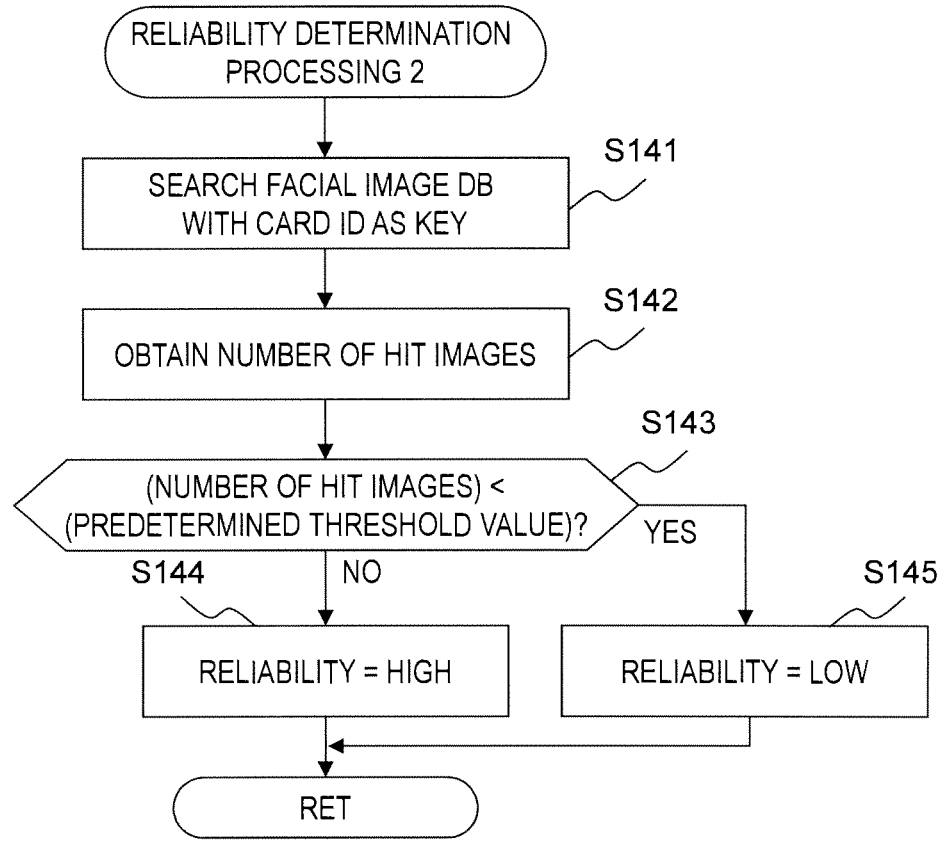
FIG. 14 is a flowchart of a fourth example of the reliability determination processing 2 according to the first embodiment of this invention.

FIG. 14 is a flowchart of a fourth example of the reliability determination processing 2 (S106). In the fourth example, reliability of the authentication is determined based on a hit count of the facial image.

First, the facial image retrieval system 106 searches the facial image database 310 by using the card ID obtained in Step S103 as a key to obtain facial images associated with the card ID (S141).

Then, the number of facial images extracted from the facial image database 310 is counted (S142), and the counted number of facial images is compared with the predetermined threshold value (S143). As a result, when the number of facial images is large, it is determined that the reliability of the authentication is high (S144). On the other hand, when the number of facial images is small, it is determined that the reliability of the authentication is low (S145). The number of threshold values used for the determination may be one or a plurality. In the case of using the plurality of threshold values, the reliability can be categorized into multiple stages of high/middle/low, and the alarm having a plurality of stages such as "normal", "caution", and "warning" can be issued.

With this arrangement, when the number of extracted facial images is large, the subject frequently tries the authentication, and hence it is highly possible that the authentication is appropriate, and the reliability thereof can be determined to be high. On the other hand, when the number of extracted facial images is small, the subject tries the authentication only occasionally, and hence it is highly possible that the authentication is inappropriate, and the reliability of the authentication can be determined to be low.

It should be noted that the number of images obtained on the occasion of the successful authentication among the extracted images may be used instead of the number of all the extracted images. By using only the facial images photographed on the occasion of the successful authentication (excluding the facial image photographed on an occasion of failed authentication), it is possible to determine the reliability with improved precision.

Further, the reliability may be determined based on a result (number of times that the authentication is tried or number of times that the authentication is successful) of the authentication using a specific management server 105 or a specific reader device 103. By using the number of times that the authentication is performed in a specific place, it is possible to detect a behavior different from the normal state, which allows the reliability to be determined with improved precision.

In addition, the number of times that the authentication fails among the past authentication results may be compared with the predetermined threshold value, to thereby issue the alarm when the number of times that the authentication fails is large.

In the reliability determination processing 2, the above-mentioned first to fourth examples may be combined. In other words, the impersonation "present" can be determined when it is determined that the reliability is low according to any one of the above-mentioned examples of determinations. Further, the impersonation "present" can be determined only when it is determined that the reliability is low according to at least two of the above-mentioned examples of determinations.

Next described is a relationship between the reliability determination processing 1 and the reliability determination processing 2.

(1) In a first pattern, the reliability determination processing 1 and the reliability determination processing 2 are the same processing, and in the reliability determination processing 2, the similarities between the images are calculated after narrowing down the images by using the card ID within a part of the facial image database 310 on which the processing according to the reliability determination processing 1 has not been finished.

For example, in a case where both the reliability determination processing 1 (S102) and the reliability determination processing 2 (S106) are the second example, the camera 102 photographs the facial image of the subject at the timing at which the subject comes into the photographing range of the camera 102 (S101), the similarities of the facial images stored in the facial image database 310 are calculated by comparing the obtained facial image of the subject and the facial images stored in the facial image database 310 (S129), the selected facial images are classified in terms of the camera (S124), and the reliability of the classified image is calculated (S125). When the reader device 103 reads the card ID during execution of the reliability determination processing 1 (S105), the reliability determination processing 1 is brought to an end (S104), and the reliability determination processing 2 is started (S106). In the reliability determination processing 2, the processing is performed on a part of the facial images included in the facial image database 310 on which the processing according to the reliability determination processing 1 has not been finished.

Then, based on an intermediate reliability output by the reliability determination processing 1 (S104) and the reliability output by the reliability determination processing 2 (S107), the impersonation is determined (S108).

According to the first pattern, before the reader device 103 reads the card ID, the obtained facial image of the subject is used to start verification or search with respect to the facial image database 310, which can reduce time after the reader device 103 obtains the card ID until the determination result of the impersonation is obtained.

It should be noted that the reliability determination processing 2 may not necessarily be executed when the reliability determination processing 1 has been completed on all the facial images stored in the facial image database 310 before the reader device 103 reads the card ID. Further, the reliability determination processing 2 may be executed to determine the impersonation based on the reliability determined by the reliability determination processing 1 and the reliability determined by the reliability determination processing 2, which may improve accuracy of the reliability of the determination.

(2) In a second pattern, the reliability determination processing 1 (S102) and the reliability determination processing 2 (S106) are different from each other, and the reliability determination processing 2 performs the determination more strictly than the reliability determination processing 1.

For example, in a case of processing a set of the same images, the number of images that are determined to be similar in the reliability determination processing 1 is larger than the number of images that are determined to be similar in the reliability determination processing 2, a determination threshold value of the similarity used by the reliability determination processing 1 is lower than the determination threshold value of the similarity used by the reliability determination processing 2, and the similarity obtained by the reliability determination processing 1 is higher than the similarity obtained by the reliability determination processing 2.

More specifically, in a case where both the reliability determination processing 1 (S102) and the reliability determination processing 2 (S106) are the third example but uses different determination threshold values, the threshold value used when the facial images are extracted from the facial image database 310 in Step S132 is set loose in the reliability determination processing 1 and set strict in the reliability determination processing 2. Then, the processing according to the reliability determination processing 2 is performed on the facial images extracted from the facial image database 310 in the reliability determination processing 1. In other words, the facial images extracted from the facial image database 310 in the reliability determination processing 1 are searched with the card ID as a key in Step S131 of the reliability determination processing 2.

(3) In a third pattern, the reliability determination processing 1 (S102) and the reliability determination processing 2 (S106) are different from each other, the reliability determination processing 1 is higher in speed than the reliability determination processing 2, and the reliability determination processing 2 is processed with higher precision than the reliability determination processing 1.

For example, in a case where the facial image database 310 includes coarse facial images having a small number of pixels and detailed facial images having a large number of pixels, the coarse facial images are used to determine the similarity/dissimilarity at high speed with low precision in the reliability determination processing 1 (S102), while in the reliability determination processing 2 (S106), the detailed facial images are used to determine the similarity/dissimilarity of the image at low speed with high precision with regard to the images narrowed down by the reliability determination processing 1.

According to the second and third patterns, before the reader device 103 reads the card ID, the obtained facial image of the subject is used to perform rough verification or search with respect to the facial image database 310, and after the reader device 103 reads the card ID, detailed verification or search is performed with respect to the facial images that have undergone the rough verification or search, which can reduce the time after the reader device 103 obtains the card ID until the determination result of the impersonation is obtained.

(4) In a fourth pattern, in the above-mentioned first to third patterns, the execution of the reliability determination processing 2 (S106) is controlled.

For example, the reliability determined by the reliability determination processing 1 is used and the reliability determination processing 2 is not executed when the reliability determination processing 1 has been completed on all the facial images stored in the facial image database 310 before the reader device 103 reads the card ID.

Further, even if the reliability determination processing 1 has not been completed on part of the facial images stored in the facial image database 310 before the reader device 103 reads the card ID, the reliability determination processing 2 is not executed when it is determined that the reliability is high by the reliability determination processing 1. In other words, when it is not determined that the reliability is high by the reliability determination processing 1, the reliability determination processing 2 is executed.

According to the fourth pattern, before the reader device 103 reads the card ID, the obtained facial image of the subject is used to perform the rough verification or search with respect to the facial image database 310, and in the case where it is determined that the reliability of the authentication is high when the reader device 103 reads the card ID, the verification or search is not performed after the reader device 103 obtains the card ID, which can reduce the time after the reader device 103 obtains the card ID until the determination result of the impersonation is obtained.

As described above, according to the first embodiment of this invention, the obtained facial image of the subject is used to start the verification or search with respect to the facial image database 310 before the reader device 103 reads the card ID, which can reduce the time after the reader device 103 obtains the card ID until the determination result of the impersonation is obtained.

Second Embodiment

In the above-mentioned first embodiment, when there is a change in a state within the photographing range of the camera 102, in other words, in the frame of the moving image photographed continuously by the camera 102, the frame is captured to photograph the still image, and the facial image of the subject included in the photographed image is accumulated in the facial image database 310. However, the facial images having various sizes which are viewed from various directions are saved in the facial image database 310, and hence the images having higher similarities and the images having lower similarities coexist even for the same person in the accumulated facial images. In this manner, the images having higher similarities with the facial image obtained when the subject directly faces the camera and the images having lower similarities therewith coexist, which causes the reliability to be determined with deteriorated precision.

Figure 15:
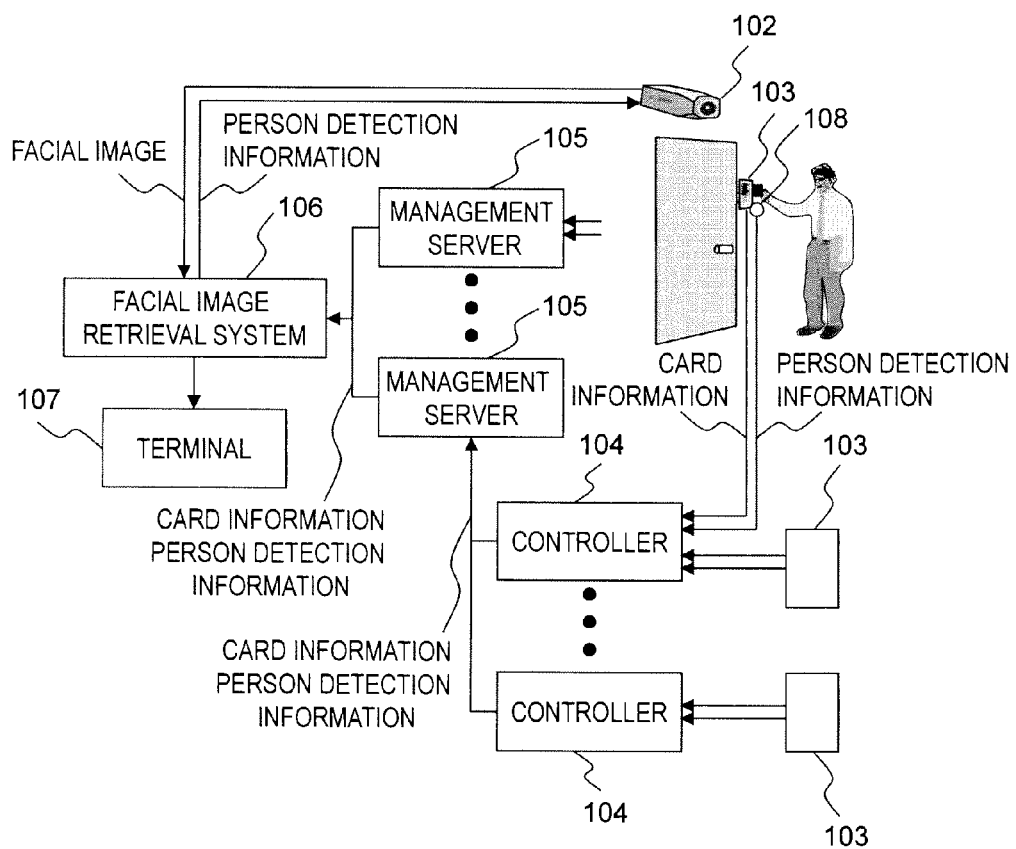
FIG. 15 is a block diagram illustrating a configuration of an authentication system according to a second embodiment of this invention.

Therefore, in a second embodiment of this invention, as shown in FIG. 15, at the timing at which the subject comes into the photographing range of the camera 102 to enable an appropriate facial image thereof to be photographed, the camera 102 photographs the facial image of the subject. In other words, a human detecting sensor 108 is provided to the reader device 103, and when the human detecting sensor 108 detects that the subject stands in front of the reader device 103 (in other words, the subject comes into the photographing range of the camera 102 and directly faces the camera), the camera 102 photographs the facial image of the subject. For example, an infrared sensor or an ultrasonic sensor can be used as the human detecting sensor 108.

The human detecting sensor 108 may be provided to the camera 102 instead of the reader device 103, and the camera 102 may photograph the facial image of the subject when the human detecting sensor 108 detects that the subject comes into the photographing range of the camera 102.

After photographing the face of the subject that has come into the photographing range, the camera 102 sends the photographed facial image to the facial image retrieval system 106. The facial image retrieval system 106 starts the impersonation detection processing by receiving the facial image photographed by the camera 102 (S101). The subsequent processing is the same as the above-mentioned first embodiment.

It should be noted that the second embodiment can be applied not only to the above-mentioned first embodiment but also to a third embodiment described later.

As described above, in the second embodiment, the facial image is photographed at the timing at which the face of the subject comes into the photographing range of the camera 102, which inhibits the facial images inappropriate for the verification from being accumulated, and can inhibit the facial image database 310 from increasing in size if this system is operated for a long term. Therefore, even if the storage capacity of the storage device (magnetic disk or the like) is small, the facial image database 310 can be stored in the storage device. Further, it is unnecessary to execute batch processing for deleting facial image data.

Third Embodiment

In the above-mentioned first embodiment, for example, after the reader device 103 is caused to read the card held by the subject, the reader device 103 reads the card ID stored in the card, and transmits the read card ID to the facial image retrieval system 106 via the management server 105 (S103). The storage medium from which the reader device 103 reads the card ID (in other words, which is held by the subject) is not limited to the magnetic card, the IC card, or the wireless tag that are exemplified in the first embodiment, and identification information assigned to and stored in a cryptographic key for an automobile, a cryptographic key for a door, or the like can be used. Further, not only the card ID stored in the storage medium, but also biometric information inherent in the subject, such as a fingerprint, a finger vein pattern, a palm vein pattern, or an iris, may be used.

Fourth Embodiment

System Configuration

Figure 16:
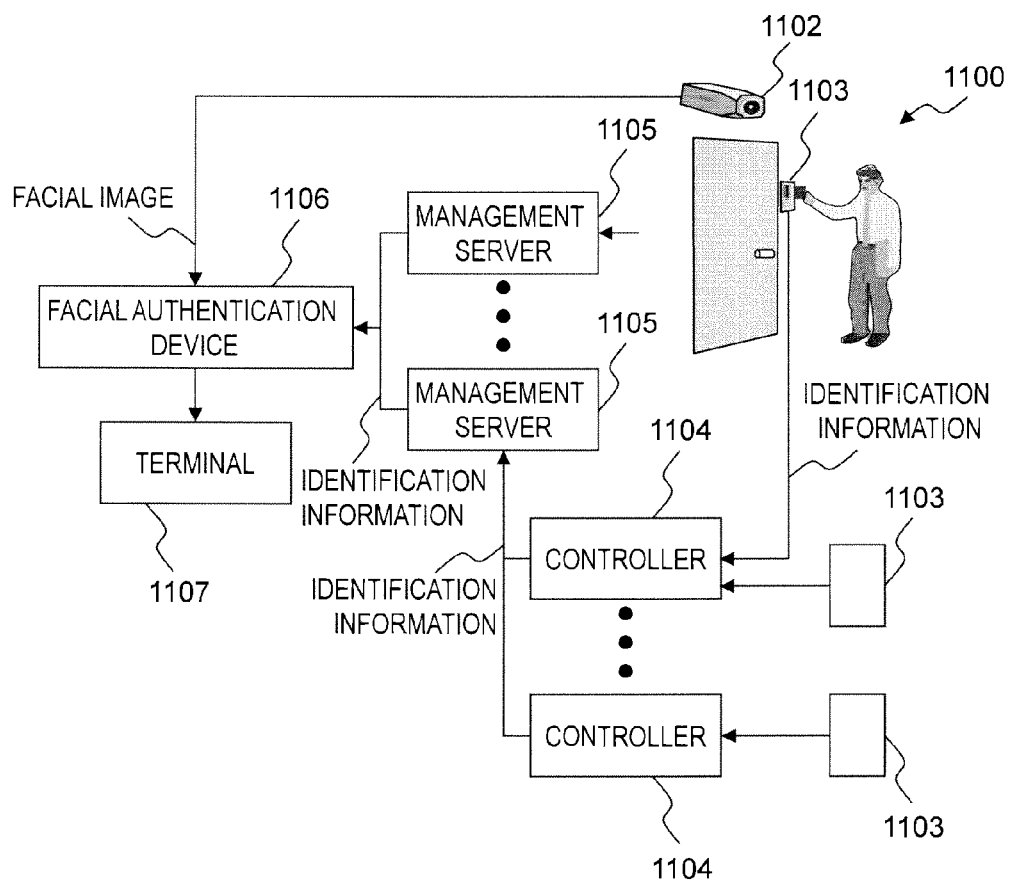
FIG. 16 is a block diagram illustrating a configuration of an authentication system according to a fourth embodiment of this invention.

FIG. 16 is a block diagram illustrating a configuration of an authentication system 1100 according to a fourth embodiment of this invention. The authentication system 1100 is a system for authenticating the user who passes through a gate based on facial authentication. The authentication system 1100 uses the storage medium held by the user to carry out the authentication in principle, but in order to eliminate such an impersonating user as to illegally obtain the storage medium of another user and attempt to illegally pass through the gate, the facial authentication is used in combination of the storage medium. If the facial authentication fails, an alarm to that effect is issued on a terminal 1107.

The authentication system 1100 includes a camera 1102, a reader device 1103, a controller 1104, a management server 1105, and a facial authentication device 1106.

The camera 1102 is an image pick-up device for photographing the facial image of the user who passes through the gate, and operates in cooperation with the reader device 1103. The camera 1102 photographs the face of the user when the user uses the reader device 1103, or, for example, for approximately several seconds before and after that event, and transmits the image to the facial authentication device 1106.

The reader device 1103 is a device, for example, a card reader, for reading identification information (card ID) stored in a storage medium (for example, magnetic card, IC card, or wireless tag) held by the user.

The controller 1104 controls the reader device 1103 to transmit identification information obtained by the reader device 1103 to the management server 1105. The management server 1105 uses the identification information to authenticate the user, and notifies the controller 1104 of the result. The controller 1104 carries out processing (for example, unlocking a door or unlocking a computer) corresponding to the authentication result. FIG. 16 illustrates an example in which a plurality of reader devices 1103 are coupled to one controller 1104, but the controller 1104 and the reader device 1103 may be coupled to each other on a one-to-one basis.

The management server 1105 is a computer including a processor for executing a program, a memory for storing the program executed by the processor, a communication interface for controlling communications to/from another device, and an authentication result database 300.

The management server 1105 controls the controller 1104 to authenticate the user by using the identification information obtained by the reader device 1103, and sends a success/failure of the authentication to the controller 1104. FIG. 16 illustrates an example in which a plurality of controllers 1104 are coupled to one management server 1105, but the management server 1105 and the controller 1104 may be coupled to each other on a one-to-one basis.

The facial authentication device 1106 is a computer including a processor for executing a program, a memory for storing the program executed by the processor, a communication interface for controlling communications to/from another device, and a facial image database 310. The facial authentication device 1106 determines similarity/dissimilarity between the facial image photographed by the camera 1102 and the facial images accumulated in the facial image database 310, and based on the result, determines presence/absence of impersonation to notify a terminal 1107 of the result. FIG. 16 illustrates an example in which a plurality of management servers 1105 are coupled to one facial authentication device 1106, but the number of management servers 1105 may be one.

The terminal 1107 is a computer including a processor for executing a program, a memory for storing the program executed by the processor, a communication interface for controlling communications to/from another device, and an input/output interface such as a keyboard, a display device, or the like.

It should be noted that the reader device 1103 and the camera 1102 may be constructed integrally. In this case, the camera 1102 and the facial authentication device 1106 may be coupled to each other through the controller 1104 and the management server 1105 instead of being directly coupled to each other.

Fourth Embodiment

Outline of Operation

The reader device 1103 obtains the identification information (card ID) stored in the card held by the user, and sends the obtained card ID to the controller 1104. The controller 1104 sends the card ID obtained by the reader device 1103 to the management server 1105. The management server 1105 sends the card ID obtained by the reader device 1103 to the facial authentication device 1106.

The management server 1105 authenticates the card ID by comparing the card ID obtained by the reader device 1103 with the identification information stored in an authentication database. When the authentication is successful, the management server 1105 notifies the controller 1104 of the successful authentication. When receiving the notification of the successful authentication, the controller 1104 unlocks a door to which the reader device 1103 is installed, and permits the user to enter/exit the room. The user may be prompted to input a PIN number on the occasion of the authentication, and the authentication may be carried out by using a combination of the PIN number input by the user to the reader device 1103 and the card ID.

On the other hand, in parallel with the management server 1105 authenticating the user by using the card ID, the camera 1102 photographs the facial image of the user, and sends the photographed facial image of the user to the facial authentication device 1106.

The facial authentication device 1106 obtains the facial image photographed by the camera 1102 and the card ID transmitted by the management server 1105, and associates the facial image photographed by the camera 1102 with the card ID based on the time instant at which the facial image is photographed and the time instant at which the card ID is obtained. The facial authentication device 1106 calculates the similarity between the facial image photographed by the camera 1102 and the facial images within the facial image database 310, and determines the similarity/dissimilarity between the two images. The similarity between the images can be calculated by using a known image matching technology. For example, it is possible to determine that the two images are more similar as a distance between feature amount vectors of the images is smaller. When the similarity/dissimilarity determination for the images is carried out, the card ID obtained by the reader device 1103 may be used to narrow down the images to be subjected to the similarity/dissimilarity determination.

The facial authentication device 1106 determines whether or not the user is impersonating another user based on a determination result of the similarity/dissimilarity determination between the facial image photographed by the camera 1102 and the facial images accumulated in the facial image database 310, and notifies the terminal 1107 of the determination result.

The terminal 1107, on which the display program (for example, web browser) is being executed, displays the determination result for the impersonation which is output from the facial authentication device 1106 on the display screen. It should be noted that the facial authentication device 1106 may output the result of the similarity/dissimilarity determination of the facial image, and the terminal 1107 may determine the presence/absence of the impersonation based on a similarity/dissimilarity determination result thereof.

Fourth Embodiment

Database Structure

In the fourth embodiment, an authentication result database included in the management server 1105 and a facial image database included in the facial authentication device 1106 are the same as the authentication result database 300 and the facial image database 310, respectively, which are described with reference to FIG. 5 and FIG. 6, respectively, in the first embodiment, and hence detailed descriptions thereof are omitted.

It should be noted that, in the time instant 301 of the authentication result database 300, year/month/day may be retained in addition to the time instant at which the card ID to be authenticated is obtained (or time instant at which the management server 1105 carries out the authentication). Further, in the case where the facial image database 310 stores a plurality of facial images in the similarity 305, the mean value of the similarities with the respective facial images or the like may be retained.

In addition, in the facial image database 310, the room entry/exit history or the like may be retained for each subject.

Fourth Embodiment

Details of Operation

Figure 17:
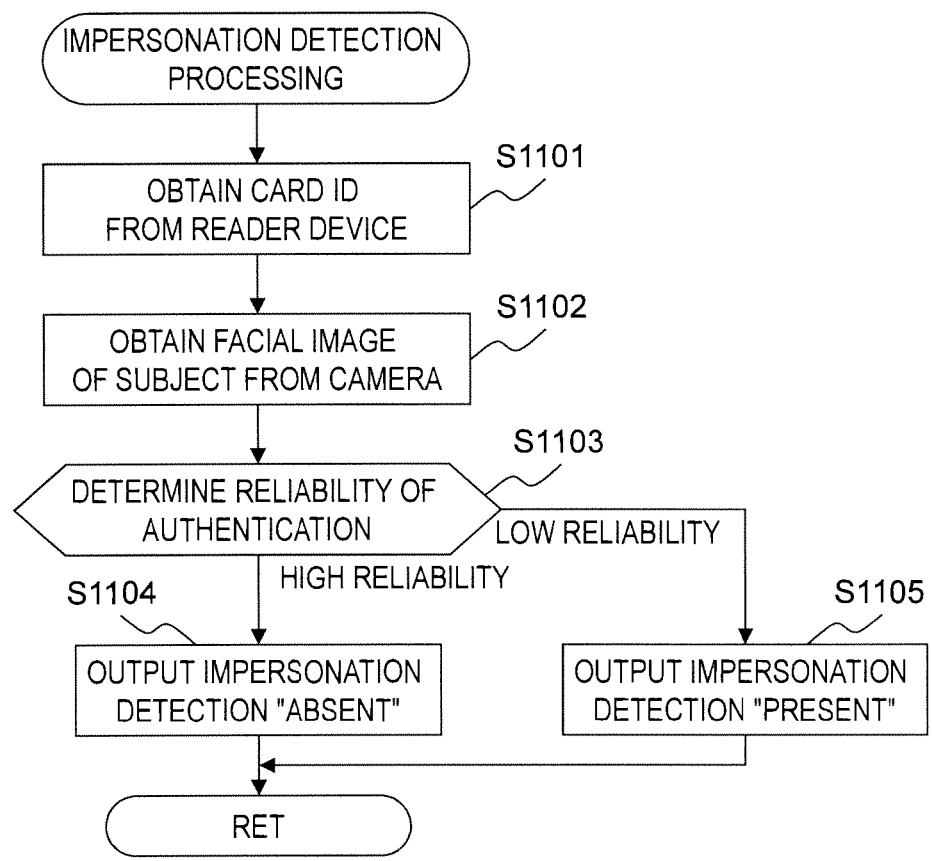
FIG. 17 is a flowchart illustrating the impersonation detection processing carried out by the facial authentication device according to a fourth embodiment of this invention.

FIG. 17 is a flowchart illustrating the impersonation detection processing carried out by the facial authentication device 1106. The impersonation detection processing illustrated in FIG. 17 is executed by the processor of the facial authentication device 1106 executing the program stored in the memory. This flowchart is carried out after a certain number of facial images are accumulated within the facial image database 310. Respective steps of FIG. 17 are described below.

(FIG. 17: Step S1101)

When the user causes the reader device 1103 to read the card held by the user, the reader device 1103 reads the card ID stored in the card, and sends the read card ID to the facial authentication device 1106 via the management server 1105. When the reader device 1103 receives the read card ID, the facial authentication device 1106 starts the impersonation detection processing.

(FIG. 17: Step S1102)

The facial authentication device 1106 identifies the reader device 1103 that has read the card ID, identifies the camera 1102 corresponding to the reader device 1103, and sends a photographing instruction to the identified camera 1102. When receiving the photographing instruction from the facial authentication device 1106, the camera 1102 photographs the face of the user that has caused the reader device 1103 to read the card, and sends the photographed facial image to the facial authentication device 1106. With the above-mentioned processing, the facial authentication device 1106 obtains the facial image photographed by the camera 1102.

The facial authentication device 1106 previously retains a database for defining a correspondence therebetween, and the identification information on (or network address of) the camera 1102 can be obtained by searching the database with the identification information on (or network address of) the reader device 1103 as a key.

In consideration of time necessary for the camera 1102 to perform photographing, the reader device 1103 may delay the timing for notifying the user of a reading completion, to thereby keep the user standing in front of the reader device 1103 until the photographing is completed.

The facial authentication device 1106 may store the facial image obtained from the camera 1102 in the facial image database 310 at the time point of this step, or may determine whether or not to store the facial image based on the determination result of Step S1103. For example, only the facial image whose authentication has been determined to be high in reliability may be stored in the facial image database 310.

(FIG. 17: Step S1103)

The facial authentication device 1106 searches the facial image database 310 with the facial image photographed by the camera 1102 as a query. The facial authentication device 1106 uses the facial image obtained as a result of the search to determine a reliability of the facial authentication. As a result of the determination, when the reliability is equal to or larger than a predetermined threshold value, the procedure advances to Step S1104, or otherwise advances to Step S1105.

(FIG. 17: Step S1103: Example of Reliability Determination)

In a case where the similarity between the facial image photographed by the camera 1102 and the facial image similar thereto which is stored in the facial image database 310 is high, it is highly possible that the user is the same person as a person having the facial image stored in the facial image database 310. In this case, it is possible to determine that the reliability of the facial authentication is high. Therefore, the facial authentication device 1106 can use the above-mentioned similarity or the numerical value derived therefrom as the reliability of the facial authentication.

When the facial image database 310 is searched for the similar image in this step, it is not always necessary to set all the facial images as search targets. For example, the search targets can be narrowed down with the card ID as a key.

(FIG. 17: Steps S1104 and S1105)

When it is determined in Step S1103 that the reliability of the authentication is high, the possibility that the user is impersonated by another person is low, and hence the facial authentication device 1106 instructs the terminal 1107 to display the impersonation detection "absent" (S1104). When it is determined in Step S1103 that the reliability of the authentication is low, the possibility that the user is impersonated by another person is high, and hence the facial authentication device 1106 instructs the terminal 1107 to display the impersonation detection "present" (S1105). After that, the processing is brought to an end with the termination command, or returns to Step S1101 without the termination command to stand by for reception of the subsequent card ID.

Figure 18:
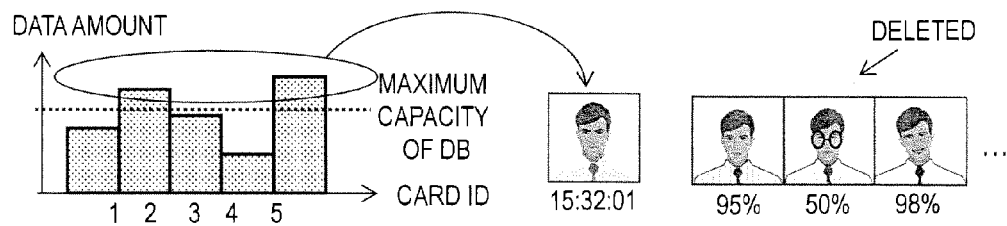
FIG. 18 is an explanatory diagram illustrating a method of deleting the facial image stored in the facial image database according to a fourth embodiment of this invention.

FIG. 18 is a diagram illustrating a method of deleting the facial image stored in the facial image database 310. With regard to the facial image database 310, in principle, the facial image of the user is accumulated each time the camera 1102 photographs the facial image, and hence a free capacity of the facial image database 310 gradually decreases. Further, there is a possibility that the facial image that is not always appropriate for the facial authentication is accumulated. Therefore, the facial authentication device 1106 uses the following method to delete the facial image within the facial image database 310. The timing to carry out the deletion may be appropriately defined as, for example, an occasion of low processing load or the like so as not to affect the operation of the system.

(1) Set the Threshold Value for Each Card ID

It is conceivable that an appropriate amount of accumulation of the facial images is different depending on the user. Therefore, the facial authentication device 1106 previously defines a threshold value for each card ID held by the user, and deletes at least part of facial images corresponding to the card ID at the time point when the size of the accumulated facial images corresponding to each card ID exceeds the threshold value for the card ID. A correlation between the card ID and the facial image can be obtained from each field of the facial image database 310. The following examples are conceivable as a reference that defines the threshold value for each card ID.

(1.1) Set the Threshold Value Based on a Frequency of Entering/Exiting from a Room It is conceivable that the amount of facial images stored in the facial image database 310 is large for the user who frequently passes through the gate, and hence it is desired that the threshold value for the user be set larger than that of the other users. On the other hand, for example, it is conceivable that the threshold value for the user such as a regular visitor who occasionally passes through the gate is set small without any problem. Therefore, for example, it is conceivable that the above-mentioned threshold value is set based on the number of records for each card ID stored in the authentication result database 300. This is because the number of records indicates the number of times that the user passes through the gate. Alternatively, the above-mentioned threshold value may be set based on the number of records within a predetermined period of time for each card ID stored in the facial image database 310.

(1.2) Set the Threshold Value for Each Classification of the Users

It is conceivable that the frequency for passing through the gate depends on an attribute of the user. For example, it is conceivable that the frequency for passing through the gate differs between an intra-company user and an extra-company user (for example, visitor). If the attributes of the users differ in this manner, the card ID of different kinds depending on the attribute may be issued. For example, it is conceivable that the card for a visitor is issued for the visitor. Therefore, with the card IDs previously classified depending on the attribute of the user, the facial authentication device 1106 may define the above-mentioned threshold value for each classification. A correlation between the card ID and the attribute may be retained on, for example, the authentication result database 300.

(2) Reference for Determining the Facial Image to be Deleted

A trigger for deleting the facial image can be defined by using the above-mentioned threshold value, but it is necessary to separately take it into consideration which facial image is to be deleted. For example, it is conceivable that the following references are used for the deletion.

(2.1) Delete the Old Facial Image

It is conceivable that the facial image deviating from the current face of the user should not be used in order to enhance the precision of the facial authentication. The face of the user changes over time (for example, with hair growing, with a beard growing, with facial expressions changing, or with aging), and hence it is conceivable that the facial image that has become old to some extent or older than that is not appropriate for the facial authentication. Therefore, the facial authentication device 1106 may delete the facial image whose photographing date/time is earlier than the predetermined threshold value.

(2.2) Delete the Facial Image Whose Similarity is Extremely Low

If the user tries to pass through the gate by impersonating another user (by using the card ID of another user), it is possible that the facial image deviating from the original facial image of the user is registered in the facial image database 310. Such a facial image is not preferred from the viewpoint of enhancing the precision of the facial authentication. Therefore, the facial authentication device 1106 may delete such a facial image from the facial image database 310. It is conceivable that such a facial image is extremely low in the value of the similarity 316, which may be used as a reference to determine the facial image to be deleted.

(2.3) Keep the Facial Image Whose Similarity is a Little Low from being Deleted

In the case of determining the reliability of the facial authentication in Step S1103, if the value of an allowable similarity is set too high, there is a possibility that the authentication fails even when the face of the user is slightly different from the facial images registered in the facial image database 310. In order to avoid such a situation, it is conceivably desired that the images registered in the facial image database 310 have variations to some extent. Therefore, the facial authentication device 1106 may keep the facial image whose similarity is a little low from being deleted. Which facial image having a similarity to which extent is to be deleted or not to be deleted differs individually depending on operation requirements, and may be appropriately defined by a designer.

Fourth Embodiment

Conclusion

As described above, in the authentication system 1100 according to the fourth embodiment, when the size of the facial images accumulated for each card ID in the facial image database 310 exceeds the threshold value defined for each card ID, the facial image corresponding to the card ID is deleted from the facial image database 310. This can inhibit a usage size of the facial image database 310 from increasing.

Further, the authentication system 1100 according to the fourth embodiment deletes the unnecessary facial image for each card ID based on the references described in the above-mentioned items (2.1) and (2.2), which can inhibit the usage size of the facial image database 310 from increasing and can enhance the precision of the facial authentication.

Fifth Embodiment

The fourth embodiment is described by taking an operation example of photographing the facial image of the user each time the authentication is tried and accumulating the photographed facial images in the facial image database 310. However, the facial images whose similarities are high and low, the facial images whose photographing dates/times (time stamps) are new and old, and the like coexist in the facial images accumulated in the facial image database 310. Such coexistence increases the data amount of the facial image database 310, increases processing time in Step S1103, and deteriorates the precision of the impersonation detection processing.

In a fifth embodiment of this invention, a description is made of a method of classifying the facial images accumulated in the facial image database 310 based on the time stamp and the similarity and deleting the facial image based on the classification. The authentication system 1100 has the same configuration as that of the fourth embodiment, and hence the description is made below mainly of different points relating to the classification of the facial images.

Figure 19:
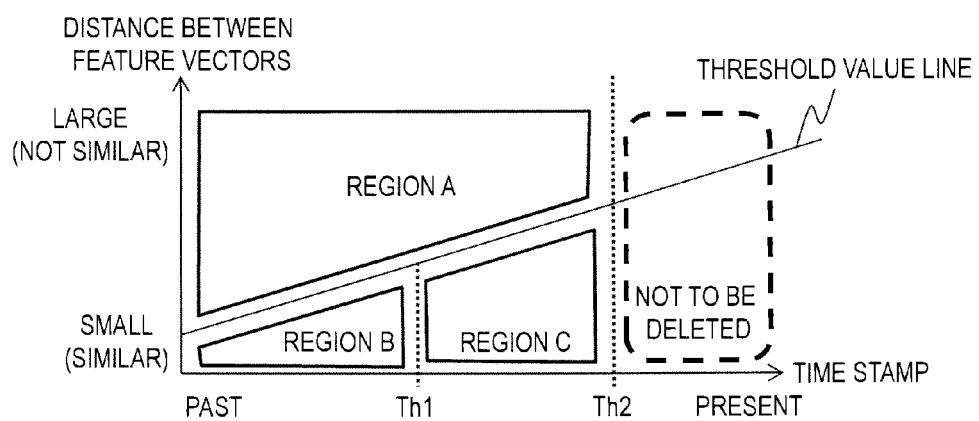
FIG. 19 is an explanatory diagram illustrating which of the facial images accumulated in the facial image database according to a fourth embodiment of this invention.

FIG. 19 is a diagram illustrating which of the facial images accumulated in the facial image database 310 is to be deleted. The fourth embodiment is described by taking the example of deleting the unnecessary facial image based on the photographing date/time and the similarity of the facial image, but in FIG. 19, the facial images are categorized more in detail, and it is defined whether or not to delete the facial image for each category. A description is made below of a method of defining respective regions of FIG. 19.

The facial authentication device 1106 calculates the similarity with another facial image with reference to relatively new facial images accumulated in the facial image database 310 (for example, facial images whose the photographing dates/times fall within a predetermined date/time range from the current date/time or latest facial image). The similarity may be calculated based on, for example, a distance between feature vectors of the images.

Subsequently, the facial authentication device 1106 plots the respective facial images within the facial image database 310 on a coordinate plane with the calculated similarity and the photographing date/time as coordinate axes thereof, and classifies the respective facial images into regions A to C illustrated in FIG. 19 with reference to a threshold value line described below and the photographing date/time. It should be noted that, in FIG. 19, the vertical axis is set as the distance between the feature vectors.

(FIG. 19: Procedure for Calculating the Threshold Value Line)

The facial authentication device 1106 defines such a line as to divide the respective facial images on the coordinate plane into two, in other words, into the high similarity and the low similarity. This line is referred to as the threshold value line. The threshold value line can be defined in a most simple manner as a linear function (y=ax+b) having an inclination of a and an intercept of b, but this invention is not limited thereto, and a high-dimensional function, an exponential function, a trigonometric function, and the like may be used.

(FIG. 19: Method of Defining a Coefficient of the Threshold Value Line)

Respective coefficients of a function of the threshold value line can be defined so that, for example, the respective facial images are arranged above and below the threshold value line as uniformly as possible. For example, in a case where the threshold value line is defined as the linear function, the inclination of a and the intercept of b may be defined so as to minimize a root sum of a distance between coordinates of the respective facial images.

(FIG. 19: Region not to be Deleted)

The facial image whose photographing date/time is new is considered to be close to the current face of the user, and is therefore kept from being deleted from the facial image database 310 no matter which side, specifically, above or below the threshold value line, the facial image is on. This corresponds to the region after a date/time threshold value Th2 (second reference date/time) of FIG. 19.

(FIG. 19: Processing on the Region A)

The facial image (region A of FIG. 19) whose photographing date/time is earlier than the date/time threshold value Th2 and whose similarity with the facial image being the reference is below the threshold value line is kept from being deleted. This is because, as described in the item (2.3) of the fourth embodiment, it is desired that the facial image whose similarity is a little low be saved. However, the facial image whose similarity is extremely low may be deleted as described in the item (2.2) of the fourth embodiment.

(FIG. 19: Processing on the Region B)

It is conceivable that the facial image whose similarity with the facial image being the reference is equal to or larger than the threshold value line may be kept as described in the fourth embodiment from the viewpoint of a facial authentication precision in principle. However, a certain number of such facial images ensure an authentication precision satisfactorily, and hence more facial images to be accumulated are redundantly retained. Therefore, the facial authentication device 1106 deletes the facial image (region B of FIG. 19) whose photographing date/time is earlier than a date/time threshold value Th1 (reference date/time) that is further earlier than the date/time threshold value Th2 from the facial image database 310.

(FIG. 19: Processing on the Region C)

It is conceivable that the facial image whose similarity with the facial image being the reference is equal to or larger than the threshold value line and whose photographing date/time is between the date/time threshold values Th1 and Th2 includes an indication that the face of the user has changed over time (hair has grown, beard has grown, facial expressions have changed, changes have occurred with aging, or the like). Those facial images are necessary from the viewpoint of ensuring variations within the facial image database 310, and are therefore kept from being deleted.

Fifth Embodiment

Conclusion

As described above, in addition to the effects of the fourth embodiment, in the authentication system 1100 according to the fifth embodiment, the facial image whose similarity with a reference image is equal to or larger than the threshold value and whose photographing date/time is earlier than the date/time threshold value Th1 is deleted from the facial image database 310. This can inhibit the usage size of the facial image database 310 from increasing. Further, by deleting the redundant facial images, the variations can be ensured while preventing the facial images within the facial image database 310 from having a biased tendency.

Further, in addition to the effects of the fourth embodiment, in the authentication system 1100 according to the fifth embodiment, the facial image whose photographing date/time is equal to or later than the date/time threshold value Th2 is kept from being deleted. This can inhibit the usage size of the facial image database 310 from increasing while ensuring the precision of the facial authentication.

Further, in the authentication system 1100 according to the fifth embodiment, the coefficients of the function of the threshold value line are adjusted, to thereby increase/decrease the area of the region B, in other words, increase/decrease the number of facial images to be deleted from the facial image database 310. In the same manner, by adjusting the date/time threshold value Th1, it is possible to increase/decrease the area of the region B. If the area of the region B becomes larger, there is an effect of securing a larger free capacity of the facial image database 310, while the variations of the facial images become less, and hence the same user may be determined to be an impersonator more frequently. In particular, if the region above the threshold value line of FIG. 19 (small similarity) becomes smaller, the variations of the facial images become considerably less.

Sixth Embodiment

The fifth embodiment is described by taking the example of calculating the similarity with another facial image with reference to a relatively new facial image and plotting the respective facial images on the coordinate plane as illustrated in FIG. 19. Instead thereof, the similarity 316 retained in the facial image database 310 can be used to plot the respective facial images on the coordinate plane as in FIG. 19. This is useful as simple processing because there is no need to newly calculate the similarity with a reference facial image as in the fifth embodiment.

However, in this case, the region above the threshold value line of FIG. 19 (region having the small similarity 316) may include the facial image whose similarity with the reference facial image is high. This is because the value of the similarity 316 at the time point when the camera 1102 photographed the facial image may differ from the similarity with the reference facial image.

Therefore, in a sixth embodiment of this invention, the facial authentication device 1106 may delete the facial image whose similarity with the reference facial image is high from the region A. This is because those images are redundantly retained in the same manner as in the region B. The threshold value used for determining whether or not the facial image is to be deleted at this time may be the same as the threshold value line or may be defined separately therefrom. This can produce the same effects as that of the fifth embodiment while suppressing an arithmetic operation load by omitting the processing for calculating the similarities between the reference facial image and the facial images within the regions B and C.

Seventh Embodiment

The fourth to sixth embodiments are described by taking the example in which the camera 1102 photographs the facial image of the user within an appropriate range before and after the reader device 1103 reads the card ID. Instead thereof, information from another sensor may be used as a trigger to photograph the facial image of the user. For example, a human sensor (for example, infrared sensor or ultrasonic sensor) is disposed in the vicinity of the camera 1102 or the reader device 1103, and at the time point when the human sensor detects that the user stands in front of the reader device 1103 (or the user comes into the photographing range of the camera 1102), the camera 1102 may photograph the facial image of the user.

Alternatively, the camera 1102 may constantly photograph the image, and when there is a change in the image, capture the moving image to obtain the still image. By thus using a motion detection technology to obtain the facial image of the user, the camera 1102 can autonomously photograph the facial image of the user without having to use another trigger such as the human sensor or the reader device 1103.

As described above, a technology for obtaining the facial image of the user with a trigger of an event other than the reader device 1103 reads the card ID can be employed in the authentication system for authenticating the user without using the reader device 1103. For example, it is conceivable that the above-mentioned method is useful because the reader device 1103 does not exist in the system for authenticating the user by using only the facial image of the user.

This invention is not limited to the above-mentioned embodiments, and various modified examples are included. The above-mentioned embodiments are described in detail in order to describe this invention for easy understanding, and this invention is not necessarily limited to what includes all the configurations described above. Further, a part of the configuration of a given embodiment can be replaced by the configuration of another embodiment. Further, the configuration of another embodiment can be added to the configuration of a given embodiment. Further, with regard to a part of the configurations of the respective embodiments, other configurations can be added/deleted/replaced.

A part or an entirety of the above-mentioned respective configurations, functions, processing modules, processing means, and the like may be implemented by hardware, for example, by being designed with an integrated circuit. Further, the above-mentioned respective configurations, functions, and the like may be implemented by software by interpreting and executing the programs whose functions are implemented respectively by the processor. The information including the programs, the tables, and the files that implement the respective functions can be stored in a recording device such as a memory, a hard disk drive, or a solid state drive (SSD) or a recording medium such as an IC card, an SD card, or a DVD.

While the present invention has been described in detail and pictorially in the accompanying drawings, the present invention is not limited to such detail but covers various obvious modifications and equivalent arrangements, which fall within the purview of the appended claims.

What is claimed is:

1. An authentication system, comprising:
    a camera configured to photograph a facial image of a subject;
    a reader configured to obtain identification information assigned to an identification device held by the subject;
    an authentication device configured to authenticate the identification information obtained by the reader and
    a management device coupled to a terminal for issuing an alarm and including an image database in which the facial image photographed by the camera is accumulated, wherein the management device is configured to:
        search, before the reader obtains the identification information, the image database by using, as a key, at least one of a plurality of images obtained by the camera;
        search, after the reader obtains the identification information, the image database by using information obtained by the reader and the plurality of images obtained by the camera;
        determine a reliability of an authentication based on a result of analyzing a retrieved facial image retrieved from the image database; and
        transmit data for issuing the alarm to the terminal in a case where it is determined that the reliability is low.

2. The authentication system according to claim 1, wherein the management device is further configured to:
    perform first determination processing for determining a first similarity between the photographed facial image and an image accumulated in the image database with a trigger of an event that the camera photographs the facial image;
    perform second determination processing for searching the image database by using the information obtained by the reader and determining a second similarity between the facial image photographed by the camera and the retrieved image with a trigger of an event that the reader obtains the information; and
    determine the reliability based on a result of the first determination processing and a result of the second determination processing.

3. The authentication system according to claim 2, wherein:
    the first determination processing starts after the camera photographs the facial image and stops after the reader obtains the information; and
    the second determination processing starts after the reader obtains the information to perform processing on a part of the image database that has not been processed by the first determination processing.

4. The authentication system according to claim 2, wherein the second determination processing is performed only on the photographed facial image that has been determined to be similar by the first determination processing.

5. The authentication system according to claim 2, wherein it is determined that the reliability is high without executing the second determination processing in a case where the first similarity is determined to be high by the first determination processing.

6. The authentication system according to claim 1, wherein:
    the authentication device is configured to accumulate the facial image in the image database after assigning a subject-basis identifier to the facial image photographed by the camera; and
    the authentication device is configured to delete a part of a plurality of facial images assigned with the subject-basis identifier from the image database in a case where an identifier-basis total size of the plurality of facial images accumulated in the image database exceeds a predetermined first threshold value defined corresponding to the subject-basis identifier, such that the part of the plurality of the facial images assigned with the subject-basis identifier exceeding the predetermined first threshold value is deleted from the image database.

7. The authentication system according to claim 6, wherein:
    the authentication device is configured to calculate, as third similarities, similarities between facial images whose photographing dates and times fall within a predetermined date and time range from a current date and time and facial images whose photographing dates and times fall out of the predetermined date and time range among the facial images accumulated in the image database; and
    the authentication device is configured to delete a part of the facial images whose photographing dates and times fall out of the predetermined date and time range and whose third similarities are larger than a predetermined second threshold value.

8. The authentication system according to claim 7, wherein the authentication device is configured to delete the facial images whose third similarities are larger than the predetermined second threshold value and whose photographing dates and times fall out of the predetermined date and time range and earlier than a predetermined first reference date and time.

9. The authentication system according to claim 7, wherein the authentication device is configured to keep, from being deleted, facial images whose third similarities are larger than the predetermined threshold value and whose photographing dates and times fall out of the predetermined date and time range and fall within a range between the first reference date and time and a second reference date and time that is later than the first reference date and time and earlier than the current date and time.

10. The authentication system according to claim 1, wherein the management device is configured to determine, before the reader obtains the identification information, the reliability of the authentication based on a result of analyzing a first facial image that is retrieved from the image database by using, as a key, the at least one of the plurality of images obtained by the camera.

11. The authentication system according to claim 1, wherein the management device is configured to search, after the reader obtains the identification information, the image database by using, as a key, the information obtained by the reader to obtain facial images associated with the information obtained by the reader.

12. The authentication system according to claim 1, wherein the management device is configured to determine, after the reader obtains the identification information, the reliability of the authentication based on a result of analyzing a second facial image that is retrieved from the image database by using, as a key, the information obtained by the reader.

* * * * *